US 11,708,877 B2

(12) United States Patent
Matsuda et al.

(10) Patent No.: US 11,708,877 B2
(45) Date of Patent: Jul. 25, 2023

(54) SHOCK ABSORBER

(71) Applicant: Hitachi Automotive Systems, Ltd., Hitachinaka (JP)

(72) Inventors: Kazuya Matsuda, Tokyo (JP); Mikio Yamashita, Hitachinaka (JP); Daisuke Tanabe, Hitachinaka (JP); Naofumi Harada, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 432 days.

(21) Appl. No.: 17/042,450

(22) PCT Filed: Apr. 9, 2019

(86) PCT No.: PCT/JP2019/015448
§ 371 (c)(1),
(2) Date: Sep. 28, 2020

(87) PCT Pub. No.: WO2019/208200
PCT Pub. Date: Oct. 31, 2019

(65) Prior Publication Data
US 2021/0123493 A1    Apr. 29, 2021

(30) Foreign Application Priority Data

Apr. 27, 2018 (JP) ................................ 2018-086303

(51) Int. Cl.
*F16F 9/18* (2006.01)
*F16F 9/34* (2006.01)
(Continued)

(52) U.S. Cl.
CPC .............. *F16F 9/187* (2013.01); *F16F 9/348* (2013.01); *F16F 9/50* (2013.01); *B60G 13/08* (2013.01);
(Continued)

(58) Field of Classification Search
CPC .... F16F 9/187; F16F 9/348; F16F 9/50; F16F 9/065; F16F 2222/12; F16F 2228/066;
(Continued)

(56) References Cited

U.S. PATENT DOCUMENTS 5,813,500 A * 9/1998 Deferme .................. F16F 9/348
188/322.22
6,371,262 B1 * 4/2002 Katou ..................... F16F 9/465
188/266.5
(Continued)

FOREIGN PATENT DOCUMENTS

CN         104948637 A       9/2015
DE   10 2018 221 290 A1   10/2020
(Continued)

OTHER PUBLICATIONS

International Search Report with English translation and Written Opinion issued in corresponding application No. PCT/JP2019/015448 dated May 21, 2019.
(Continued)

*Primary Examiner* — Thomas J Williams
*Assistant Examiner* — James K Hsiao
(74) *Attorney, Agent, or Firm* — Foley & Lardner LLP

(57) ABSTRACT

A shock absorber includes a cylinder sealed with a working oil liquid, a piston slidably fitted in the cylinder, a piston rod connected to the piston and extended to the outside of the cylinder, and a plurality of passages through which the working oil liquid flows due to the sliding of pistons therein, and a damping force generating mechanism that is provided in a part of the passages and suppresses the flow of the working oil liquid to generate a damping force. The damping force generating mechanism includes a valve body through which the passage penetrates, an annular seat that projects from the valve body and surrounds the passage, and a disc (Continued)

that can be seated on the seat. A contact width at which the disc and the seat come into contact with each other is different depending on a position in the circumferential direction. As a result, it is possible to obtain a shock absorber capable of suppressing a sudden change in damping force before and after the opening of the disc valve without having a complicated structure.

12 Claims, 12 Drawing Sheets

(51) Int. Cl.
  *F16F 9/50* (2006.01)
  *B60G 13/08* (2006.01)
  *B60G 17/08* (2006.01)
  *F16F 9/348* (2006.01)
  *F16F 9/06* (2006.01)

(52) U.S. Cl.
  CPC .......... *B60G 17/08* (2013.01); *B60G 2202/24* (2013.01); *B60G 2206/41* (2013.01); *B60G 2500/11* (2013.01); *B60G 2800/162* (2013.01); *F16F 9/065* (2013.01); *F16F 2222/12* (2013.01); *F16F 2228/066* (2013.01); *F16F 2232/08* (2013.01); *F16F 2234/02* (2013.01)

(58) Field of Classification Search
  CPC .. F16F 2232/08; F16F 2234/02; B60G 13/08; B60G 17/08; B60G 2202/24; B60G 2206/41; B60G 2500/11; B60G 2800/162
  See application file for complete search history.

(56) References Cited

U.S. PATENT DOCUMENTS

| | | | | |
|---|---|---|---|---|
| 8,800,729 | B2* | 8/2014 | Yabe | F16F 9/465 188/266.6 |
| 9,121,524 | B2* | 9/2015 | Ashiba | F16K 47/00 |
| 9,150,077 | B2* | 10/2015 | Roessle | F16F 15/023 |
| 9,353,818 | B2* | 5/2016 | Marking | F16F 9/19 |
| 2006/0225976 | A1* | 10/2006 | Nakadate | F16F 9/464 188/266 |
| 2011/0209956 | A1* | 9/2011 | Maeda | F16F 9/369 188/322.13 |
| 2014/0150897 | A1* | 6/2014 | Ashiba | F16F 9/3485 137/343 |
| 2014/0262655 | A1* | 9/2014 | Tuts | F16F 9/512 188/322.15 |
| 2015/0276000 | A1 | 10/2015 | Kimura et al. | |
| 2015/0337918 | A1* | 11/2015 | Rummel | B60G 13/08 188/315 |
| 2016/0146286 | A1* | 5/2016 | Rummel | F16F 9/3484 188/313 |
| 2017/0321778 | A1* | 11/2017 | Knezevic | F16F 9/3484 |
| 2019/0285130 | A1* | 9/2019 | Rösseler | F16F 9/3485 |

FOREIGN PATENT DOCUMENTS

| | | |
|---|---|---|
| JP | S61-047134 U | 3/1986 |
| JP | H03-163234 A | 7/1991 |
| JP | H05-001738 A | 1/1993 |
| JP | 2009-133425 A | 6/2009 |
| JP | 2014-129865 A | 7/2014 |

OTHER PUBLICATIONS

Office Action issued in corresponding Chinese Patent Application No. 201980023094.5 dated Jul. 29, 2021 with partial English translation.
Chinese Office Action dated Feb. 7, 2022 for Chinese Patent Application No. 201980023094.5 with Machine Translation (11 pages).
German Office Action dated Jan. 21, 2022 for German Patent Application No. 112019001113.8 with English Translation (15 pages).
Japanese Office Action dated Jan. 11, 2022 for Japanese Patent Application No. 2018-086303 with Machine Translation (8 pages).
Korean Office Action dated Jan. 25, 2022 for Korean Patent Application No. 10-2020-7027959 with Machine Translation (15 pages).

\* cited by examiner ($\theta = 72°$, $\theta' = 18°$, n=4)

($\theta = 72°$, $\theta' = 18°$, n=8)

($\theta = 72°$, $\theta' = 18°$, n=12)

SHOCK ABSORBER

TECHNICAL FIELD

The present invention relates to a shock absorber that uses fluid pressure to generate a damping force with respect to a stroke of a piston rod, and is particularly suitable as a shock absorber mounted on a suspension device of a vehicle such as an automobile.

BACKGROUND ART

For example, a cylindrical shock absorber mounted on a suspension device of a vehicle such as an automobile is generally provided with a piston in which a rod is connected in a cylinder in which a working fluid is sealed, and the piston is slidably provided in the piston portion. A damping force generating mechanism including an orifice, a disc valve and the like is provided in the piston portion. As a result, the flow of the working fluid caused by the sliding of the piston in the cylinder accompanying the expansion and compression of the rod is controlled by the orifice and the disc valve to generate a damping force.

In the above-mentioned shock absorber mounted on a suspension device of the vehicle such as an automobile, a hydraulic shock absorber using oil or the like as a working oil liquid is used. A conventional shock absorber includes, for example, a piston that is provided slidably in a cylinder in which a working oil liquid is sealed, and a piston that divides the inside of the cylinder into two chambers, a piston rod that has one end connected to the piston and another end protruding to the outside of the cylinder, a working oil flow path that is provided in the piston and connects the two chamber, and a disc valve that is formed at the end of the working oil flow path in the piston and gives a flow resistance on the working oil flowing in the working oil flow path when the piston operates to generate a damping force.

Further, the piston is provided with a valve seat portion (seat) on which the disc valve is seated. The disc valve is configured by a plurality of laminated discs. As needed, the disc valve may be provided with an orifice which is configured by a notch or a hole on the outer peripheral portion of the disc for the purpose of generating a damping force when the piston reciprocates at a low speed.

However, in the conventional shock absorber, the damping force rapidly changes before and after the disc valve is opened, which is not preferable from the viewpoint of riding comfort and the like.

To solve this problem, for example, JP 3-163234 A (PTL 1) discloses a hydraulic shock absorber in which the inside of the cylinder is divided into two upper and lower oil chambers via a partition member (piston), and a plurality of ports that communicate the two oil chambers are provided in the partition member, and a leaf valve is provided to be freely open and close at the outlet end of the port. A groove-shaped opening is provided at the outlet of each port, and a pressure receiving area of at least one opening is made large with respect to the relief valve.

With such a structure, it is possible to shift the opening timing of the leaf valves having different pressure receiving areas, so that the damping force immediately after the valve opening can be adjusted, and a shock absorber can be obtained which has a less change in damping force immediately after the valve opening.

In addition, in the microfilm (PTL 2) of Japanese Patent Application No. 59-133428 (Japanese Utility Model Publication No. 61-47134), there is disclosed a hydraulic shock absorber which is configured to generate a damping force by an oil passage formed in a piston. In the hydraulic shock absorber, the round surface (annular seat portion) on the compression side or the extension side of the piston is made in at least two stages, and a first valve mechanism is provided on a small diameter round surface side, and a second valve mechanism on a large diameter round surface side.

As described above, there is disclosed a shock absorber which has a configuration having at least two stages of annular seat portions and which realizes a similar effect by switching the working oil flow path in accordance with the opening of the disc valve.

CITATION LIST

Patent Literature

PTL 1: JP 3-163234 A
PTL 2: Microfilm of Japanese Utility Model Application No. 59-133428 (Japanese Utility Model Laid-Open No. 61-47134)

SUMMARY OF INVENTION

Technical Problem

The shock absorber as described in PTL 1 has a problem that it is difficult to secure the sealing property when the valve is closed because a plurality of leaf valves are used.

That is, when the valve is closed, the piston and the disc valve are in close contact with each other via the seat portion, and it is necessary to secure the damping force by narrowing the working oil flow path. However, in the case of a leaf valve, since the diameter of the seat portion (grooved opening) is different in the circumferential direction of the piston, it is necessary to secure the flatness of the seat portion and the disc valve so that they are in close contact with each other. For this reason, it is necessary to manufacture the seat portion with high dimensional accuracy, and the structure of the leaf valve is complicated.

Further, in the shock absorber described in PTL 2, since the annular seat portion is used, for example, the portion where the disc valve in the center of the piston is laminated is lower than the seat portion, so that when the disc valve is laminated and fixed, it is relatively easy to apply an excess load in the axial direction of the piston rod. Therefore, it is possible to bring the seat portion and the disc valve into close contact with each other.

However, in PTL 2, since it has a configuration having a plurality (two steps) of annular seat portion, the structure of the piston is complicated, and when applying the excess load, all of the plurality of annular seat portions are necessary to be in close contact with the disc valve, and there is a problem that the deflection of the disc valve is limited.

An object of the invention is to provide a shock absorber capable of suppressing a sudden change in damping force before and after the opening of the disc valve without having a complicated structure.

Solution to Problem

In order to achieve the above object, a shock absorber of the invention includes a cylinder in which a working oil liquid is sealed, a piston that is slidably fitted in the cylinder, a piston rod that is connected to the piston and extended to the outside of the cylinder, a plurality of passages through which the working oil liquid flows when the piston slides in the cylinder, and a damping force generating mechanism that is provided in a part of the passage and suppresses a flow of the working oil liquid to generate a damping force. The damping force generating mechanism includes a valve body through which the passage penetrates, an annular seat that projects from the valve body and surrounds the passage, and a disc that is placed to be seated on the seat. A contact width at which the disc and the seat come into contact with each other is different depending on a position in a circumferential direction.

According to another feature of the shock absorber of the invention, the shock absorber includes a cylinder in which a working oil liquid is sealed, a piston that is slidably fitted in the cylinder, a piston rod that is connected to the piston and extended to the outside of the cylinder, a plurality of passages through which the working oil liquid flows when the piston slides in the cylinder, and a damping force generating mechanism that is provided in a part of the passage and suppresses a flow of the working oil liquid to generate a damping force. The damping force generating mechanism includes the piston in which the passage penetrates, a plurality of annular valve seat portions that are provided projecting on both sides in an axial direction of the piston and surround each of one sides of the plurality of passages, and a disc valve that seats on each of the plurality of valve seat portions, fixed on both sides of the piston in the axial direction, and includes a plurality of discs. At least one of the plurality of valve seat portions is configured such that a contact width at which the disc and the valve seat portion come into contact with each other is different depending on a portion in a circumferential direction.

Advantageous Effects of Invention

According to the invention, it is possible to obtain a shock absorber capable of suppressing a sudden change in damping force before and after the opening of the disc valve without having a complicated structure.

DESCRIPTION OF EMBODIMENTS

Figure 1:
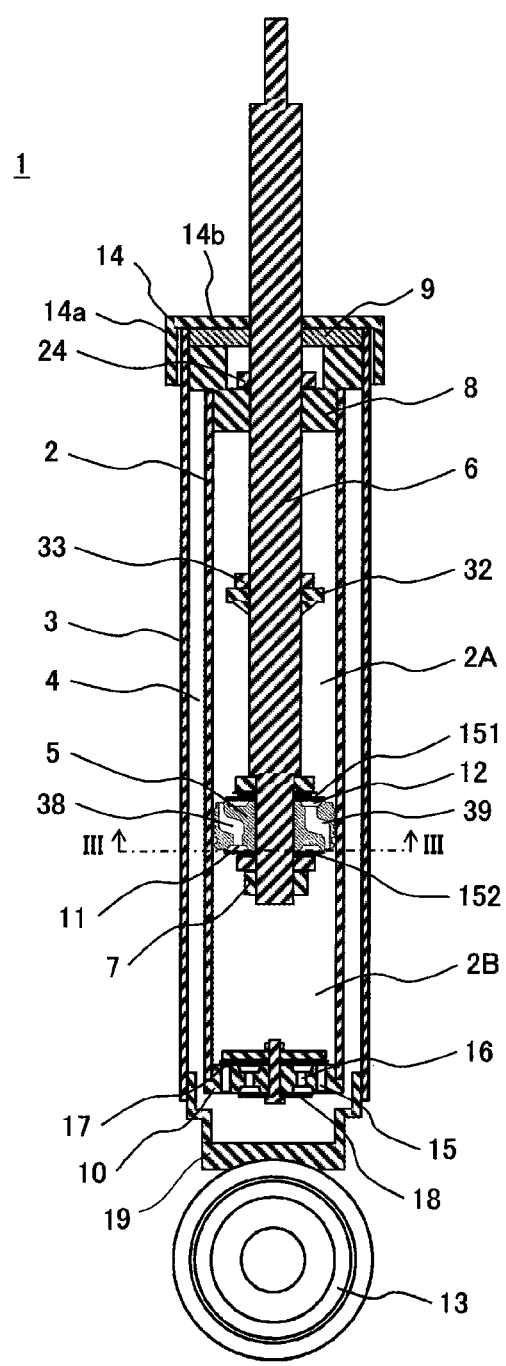
FIG. 1 is a vertical cross-sectional view illustrating a first embodiment of a shock absorber of the invention.

Hereinafter, specific embodiments of a shock absorber of the invention will be described below using the drawings. In each drawing, the parts to which the same reference numerals are attached indicate the same or corresponding parts.

First Embodiment

A first embodiment of the shock absorber of the invention will be described using FIGS. 1 to 5.

FIG. 1 is a vertical cross-sectional view of the shock absorber of the first embodiment.

As illustrated in FIG. 1, a shock absorber 1 according to this embodiment is a hydraulic shock absorber having a multi-cylinder structure which is included in an outer cylinder 3 concentrically provided on the outer side of a cylinder 2, and in which an oil liquid is enclosed as a working liquid.

A reservoir 4 is formed between the cylinder 2 and the outer cylinder 3. A piston (valve body) 5 is slidably fitted in the cylinder 2, and the piston 5 defines the interior of the cylinder 2 into two chambers, a cylinder upper chamber 2A and a cylinder lower chamber 2B.

One end of a piston rod 6 is connected to the piston 5 by a nut 7, and the other end side of the piston rod 6 passes through the cylinder upper chamber 2A, inserted to a rod guide 8 and a seal member 9 which are attached to the upper ends of the cylinder 2 and the outer cylinder 3, and extended to the outside of the cylinder 2. The piston 5 and the piston rod 6 move integrally, and the piston 5 moves to the cylinder upper chamber 2A side (upward side) in the extension stroke in which the piston rod 6 increases the amount of protrusion from the cylinder 2. On the other hand, the piston 5 moves to the cylinder lower chamber 2B side (downward side) in the compression stroke in which the piston rod 6 reduces the amount of protrusion from the cylinder 2.

The seal member 9 is mounted in the outer cylinder 3 on the upper side (outer side) of the rod guide 8 provided on the upper end opening side of the cylinder 2 and the outer cylinder 3. A friction member 24 is provided on the rod guide 8 at a position closer to the cylinder 2 than the seal member 9. The rod guide 8, the seal member 9, and the friction member 24 are all annular. The piston rod 6 is slidably inserted into each of the rod guide 8, the friction member 24, and the seal member 9, and is extended to the outside of the cylinder 2.

The rod guide 8 supports the piston rod 6 so as to be movable in the axial direction while regulating the radial movement of the piston rod 6, and guides the movement of the piston rod 6. The seal member 9 is in close contact with the outer cylinder 3 at its outer peripheral portion, and is in sliding contact with the outer peripheral portion of the piston rod 6 moving in the axial direction at its inner peripheral portion, so that the oil liquid inside the cylinder 2 and highly-pressured gas and oil liquid in the reservoir 4 in the cylinder 3 are prevented from leaking to the outside. The friction member 24 is for generating frictional resistance on the piston rod 6 by making sliding contact with the outer peripheral portion of the piston rod 6 in the inner peripheral portion. The friction member 24 is not intended for sealing.

The rod guide 8 has a stepped shape in which the outer peripheral portion has a larger diameter in the upper portion than in the lower portion, and is fitted to the inner peripheral portion of the upper end of the cylinder 2 in the lower portion of the small diameter, and is fitted to the inner peripheral portion of the outer cylinder 3 in the upper portion of the large diameter. A part of the upper end of the outer cylinder 3 is crimped inward in the radial direction, and the seal member 9 is provided between the crimped portion and the rod guide 8.

A cover member 14 is provided to cover the upper opening of the outer cylinder 3. The cover member 14 includes the cylindrical portion 14a and an inner flange portion 14b which extends from the upper end side of the cylindrical portion 14a inwardly in the radial direction. A female screw is formed on the inner peripheral portion of the cylindrical portion 14a, and a male screw is formed on the outer periphery on the upper end side of the outer cylinder 3. The cover member 14 is coated on the upper end opening portion of the outer cylinder 3, and fixed to the outer cylinder 3 by fastening the female screw and the male screw of the outer cylinder 3 together.

The piston rod 6 is provided with an annular stopper member 32 and a shock absorbing body 33 between a portion where the piston 5 on the tip side is provided and the other end. The piston rod 6 is inserted through the inner peripheral side of the stopper member 32, and the stopper member 32 is crimped and fixed in a fixing groove (not illustrated) provided on the outer peripheral surface side of the piston rod 6. The shock absorbing body 33 is made of an elastic material. The piston rod 6 is inserted through the inner peripheral side thereof, and is provided between the stopper member 32 and the rod guide 8.

The outer cylinder 3 is formed into a substantially cylindrical shape, and a bottom member 19 that closes the bottom of the outer cylinder 3 is fitted and fixed to the lower side of the outer cylinder 3. A base valve (valve body) 10 that divides the cylinder lower chamber 2B and the reservoir 4 is installed above the bottom member 19. The base valve 10 is fitted and fixed to the inner peripheral portion of the lower end of the cylinder 2.

The base valve 10 is provided with passages 15 and 16 that connect the cylinder lower chamber 2B and the reservoir 4. The passage 15 is provided with a check valve (disc) 17 that allows only the flow of the oil liquid from the reservoir 4 side to the cylinder lower chamber 2B side. Further, the passage 16 is provided with a disc valve 18 that opens when the pressure of the oil liquid on the cylinder lower chamber 2B side reaches a predetermined pressure and relieves this pressure to the reservoir 4 side. An oil liquid as a working liquid is enclosed in the cylinder 2, and an oil liquid and a gas such as nitrogen gas are enclosed in the reservoir 4.

In the shock absorber 1, the protruding portion of the piston rod 6 from the cylinder 2 is disposed at the upper part and is connected to the vehicle body side. The bottom member 19 of the lower part of the outer cylinder 3 is provided with a mounting eye 13 and is connected to the wheel side. On the contrary, the outer cylinder 3 side may be connected to the vehicle body side and the piston rod 6 side may be connected to the wheel side.

When the wheels vibrate along with the traveling of the vehicle, the positional relationship between the cylinder 2 and the piston rod 6 relatively changes, but the change at this time is suppressed by the oil liquid resistance of the flow path formed in the piston 5. That is, passages 11 and 12 and passage holes 38 and 39 are formed in the piston (valve body) 5, and disc valves 151 and 152 for adjusting the oil liquid resistance of these passages are provided. The oil liquid resistance changes according to the speed and amplitude of the vibration of the wheels, and is configured to improve the riding comfort by suppressing the vibration from the road surface.

Between the cylinder 2 and the piston rod 6, in addition to the vibration transmitted from the wheels, inertial force and centrifugal force generated in the vehicle body as the vehicle travels also act. For example, when the traveling direction changes due to steering, a centrifugal force is generated in the vehicle body, and a force based on this centrifugal force acts between the cylinder 2 and the piston rod 6. The shock absorber according to this embodiment has good characteristics with respect to vibration based on the force generated in the vehicle body as the vehicle travels, and can improve the stability when the vehicle travels.

Next, the structure of the piston 5, which is the main damping force generating mechanism in the shock absorber 1 of this embodiment, will be described in detail. The piston 5 is provided with a plurality of passages 11 and 12 that communicate between the cylinder upper chamber 2A and the cylinder lower chamber 2B. The disc valve 152 is provided in the passage 11 and communicates with the passage hole 38. A disc valve 151 is provided in the passage 12 and communicates with the passage hole 39.

When the pressure of the oil liquid (working liquid) on the cylinder upper chamber 2A side reaches a set pressure, that is, when the pressure difference of the oil liquid between the cylinder lower chamber 2B side and the cylinder upper chamber 2A side reaches a predetermined differential pressure, the disc valve 151 opens to relieve the oil liquid on the cylinder lower chamber 2B side to the cylinder upper chamber 2A side. Further, the disc valve 152 opens when the pressure of the oil liquid on the cylinder upper chamber 2A side reaches a set pressure, and relieves the oil liquid on the cylinder upper chamber 2A to the cylinder lower chamber 2B side.

That is, when the piston 5 moves due to the vibration of the vehicle or the like, the oil liquid is adjusted and flows between the cylinder upper chamber 2A and the cylinder lower chamber 2B according to the moving speed of the piston 5 via the passages 11 and 12, the passage holes 38 and 39, and the disc valves 151 and 152.

Figure 3:
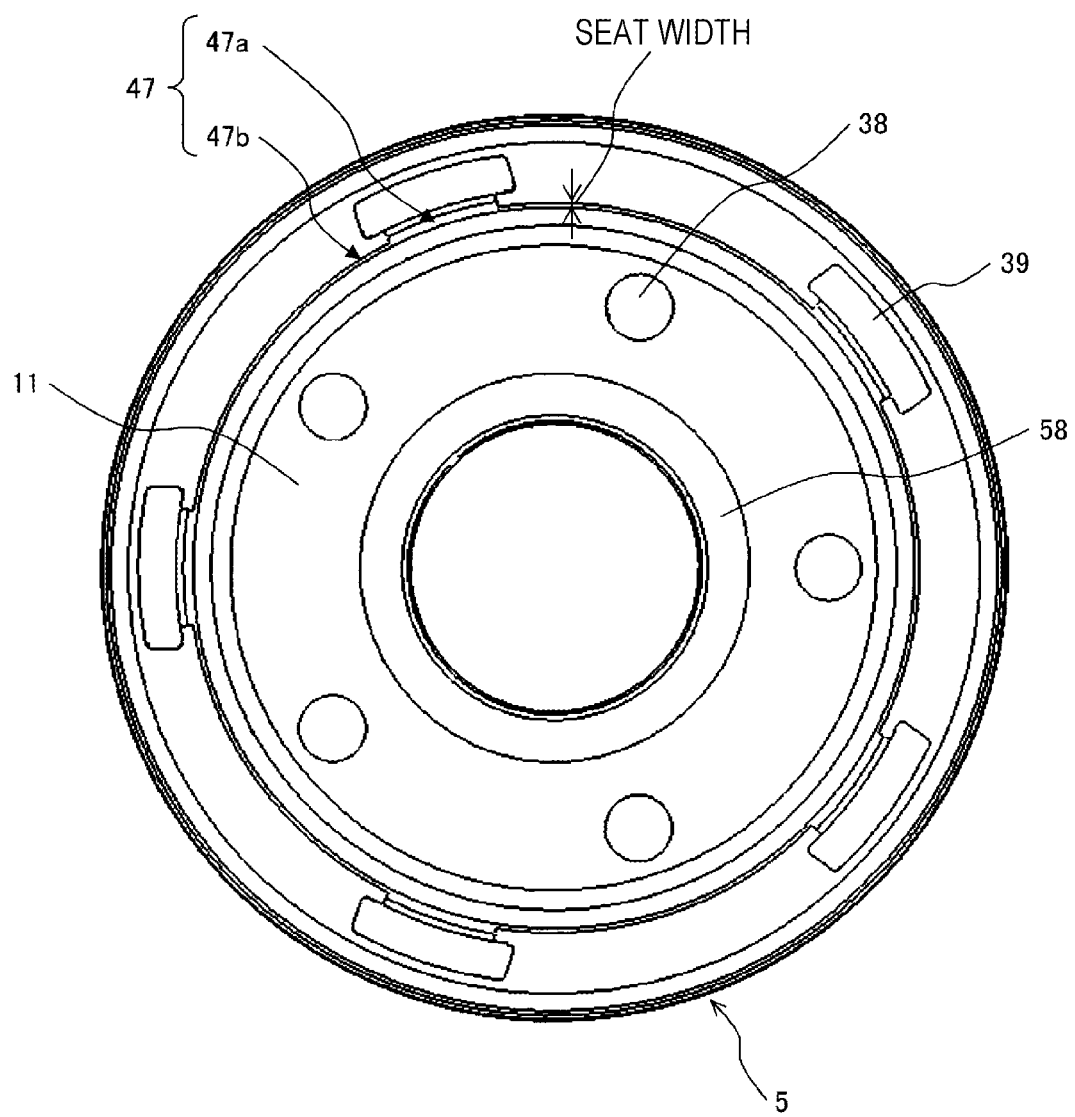
FIG. 3 is a bottom view of the piston as viewed in the direction of arrows along the line III-III in FIG. 1.

In this embodiment, as illustrated in FIG. 3 described later, the passage holes 38 are formed at equal pitches in the circumferential direction of the piston 5, and the passage holes 39 are provided at equal pitches in the circumferential direction on the outer peripheral side between the passage holes 38. The pitch at which the passage holes 38 and 39 are provided may be changed, or the passage holes 38 and 39 may be formed continuously in the circumferential direction.

On the outer peripheral surface of the piston 5, there is provided an annular synthetic resin sliding member (not illustrated) which is integrally mounted on the outer peripheral surface of the piston 5 and slides on the inner surface of the cylinder 2.

Figure 2:
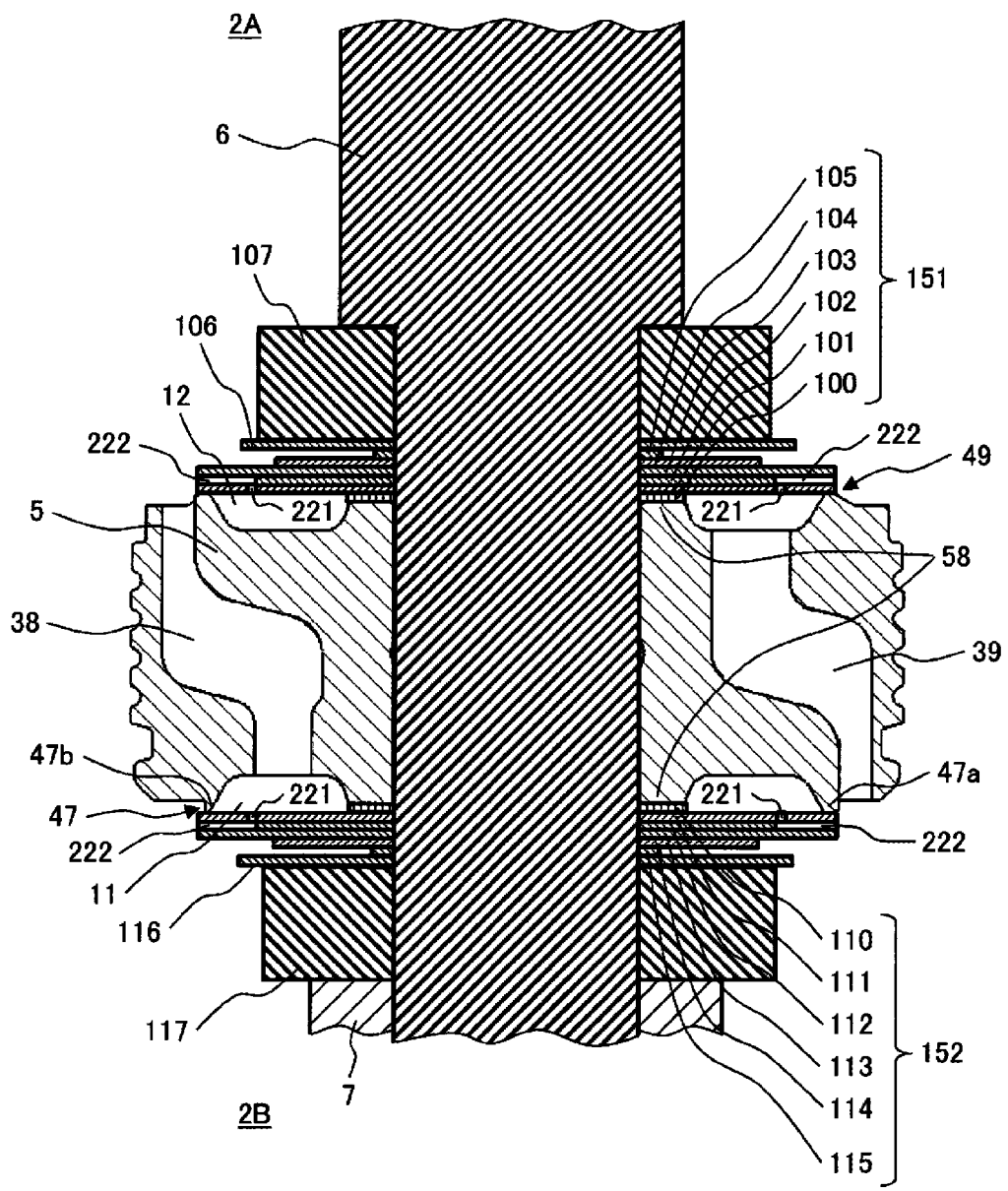
FIG. 2 is an enlarged cross-sectional view of a main part around a piston in FIG. 1.

Next, the detailed shape of the piston 5 will be described using FIG. 2. FIG. 2 is an enlarged cross-sectional view of the main part around the piston 5 in FIG. 1.

An annular valve seat portion (seat) 47 is formed at the end of the piston 5 on the cylinder lower chamber 2B side in the axial direction, which is radially outside of the passage 11 and the opening of the passage hole 38 on the cylinder lower chamber 2B side. Further, an annular valve seat portion (seat) 49 is formed at the end of the piston 5 on the cylinder upper chamber 2A in the axial direction, which is radially outside of the passage 12 and the opening of the passage hole 39 on the cylinder upper chamber 2A side.

It is preferable that the corners of the valve seat portion 47 and the valve seat portion 49 be provided with a taper or a radius in order to prevent the manufacturing surface and the oil liquid flow path from expanding or contracting rapidly.

An annular member 107, a disc 106 to a disc 100, a piston 5, a disc 110 to a disc 116, and an annular member 117 are laminated on the piston rod 6 in this order from the upper side and fixed to the piston rod 6. The discs 106 to 100 form the disc valve 151, and the discs 110 to 116 form the disc valve 152. The disc valves 151 and 152 generate a damping force with respect to the movement of the piston rod 6, and the respective discs 100 to 106 and 110 to 116 have different thicknesses, or a single disc may be configured by a plurality of discs in order to appropriately adjust the damping force.

Each of the discs is mainly made of metal, and each disc is in the form of a perforated disc having a rod through hole capable of penetrating the piston rod 6 on the inner diameter side. The piston 5 and the discs 100 to 106 and 110 to 116 are passed through the piston rod 6 and stacked, and then fixed by a predetermined axial force applied by the nut 7.

The disc 101 and the disc 111 are fixed to fixing portions 58 at both axial ends of the piston 5. The fixing portions 58 are formed at a height equal to or lower than the valve seat portions 47 and 49 with respect to the axial direction of the piston 5. As a result, the disc valve 151 can be easily brought into close contact with the valve seat portion 47, and the flow of the oil liquid can be hindered.

Further, the valve seat portions 47 and 49 are formed in a circular shape on the inner diameter side thereof. When the disc valves 151 and 152 are fixed to the piston 5, the valve seat portion 47 and the disc 111, and the valve seat portion 49 and the disc 101 are evenly brought into close contact with each other in the circumferential direction, and the leakage of the oil liquid can be prevented.

The discs 101 and 102, and the discs 111 and 112 have holes 221 and notches 222 so that a small amount of oil liquid can flow even when the disc valves 151 and 152 are closed in close contact with the valve seat portions 47 and 49. The holes 221 and the notches 222 form orifices. In this embodiment, the hole 221 is formed in each of the disc 101 and the disc 111, and this hole 221 is provided on the inner diameter side of the portion in close contact with the valve seat portion 47 or 49, respectively. Therefore, the valve seat portion 47 and the disc 111, and the valve seat portion 49 and the disc 101 are configured to be in close contact with each other over the entire circumference.

Further, the notches 222 communicating with the hole 221 and communicating with the cylinder upper chamber 2A or the cylinder lower chamber 2B are formed on the outer peripheral end sides of the disc 102 and the disc 112.

The shape, number, and position of the hole 221 and the notch 222 are arbitrarily determined according to the damping force characteristics of the target shock absorber 1. That is, a large damping force can be obtained even when the sliding speed of the piston rod 6 is low by reducing the passage area of the hole 221 or the notch 222 through which the oil liquid flows. The position where the hole 221 or the notch 222 is provided may be provided directly above the passage holes 38 and 39, as illustrated in FIG. 2, regardless of the positions of the passage holes 38 and 39.

Next, the detailed shape of the piston (valve body) 5 will be described using FIG. 3. FIG. 3 is a bottom view of the piston 5 as viewed in the direction of arrow III-III in FIG. 1.

FIG. 3 illustrates the configuration of the lower side of the piston 5, and mainly illustrates the configuration of the portion that generates a damping force when the piston rod 6 extends from the cylinder 2, that is, during the extension stroke.

In this embodiment, the valve seat portion 47 is configured by a large seat portion 47a having a large seat width and a small seat portion 47b having a small seat width. The outer diameter of the disc 111 that comes into close contact with the valve seat portion 47 is set to be larger than the outer diameter of the large seat portion 47a. In FIG. 3, the large seat portion 47a is provided adjacent to the passage hole 39, but the invention is not limited to such a configuration. The large seat portion 47a may be provided between adjacent passage holes 39. When the large seat portion 47a is provided between the passage holes 39, it is possible to further increase the radial seat width of the large seat portion 47a. Further, in FIG. 3, the small seat portion 47b is adjacent to the passage hole 38, but the configuration is not limited to this.

Next, the flow of the oil liquid and the damping force to be generated in the extension stroke in which the piston rod 6 extends from the cylinder 2 upward in FIG. 2 will be described using FIGS. 2 and 3.

When the moving speed of the piston rod 6 is small, the pressure of the oil liquid applied to the disc valve 152 is small, so the disc valve 152 does not open.

In this case, the oil liquid passes from the cylinder upper chamber 2A through the passage hole 38 and the passage 11 and flows out to the cylinder lower chamber 2B from the hole 221 formed in the disc 111 and the notch 222 formed in the disc 112. Further, the oil liquid flows from the cylinder upper chamber 2A into the passage 12 through the hole 221 formed in the disc 101 and the notch 222 formed in the disc 102, and flows out to the cylinder lower chamber 2B through the passage hole 39.

Figure 4:
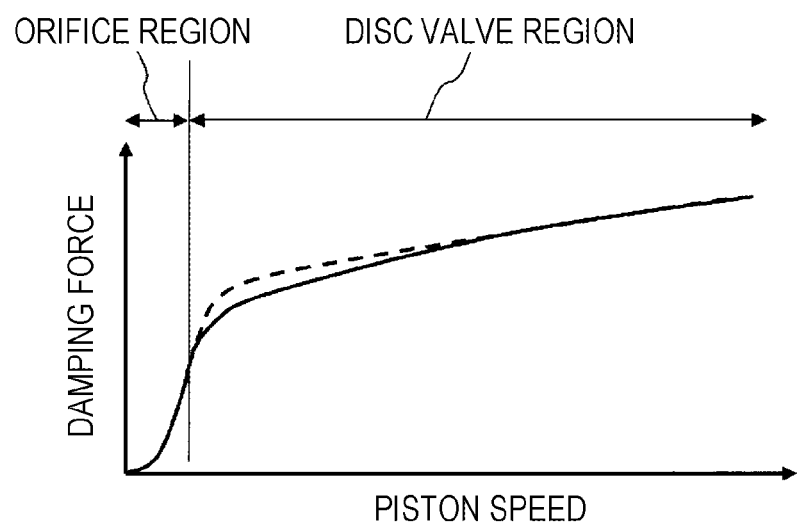
FIG. 4 is a diagram illustrating a change in damping force with respect to a piston speed in the shock absorber of the first embodiment.

The relationship between the sliding speed of the piston 5 and the damping force at this time will be described using FIG. 4. FIG. 4 is a diagram illustrating a change in damping force with respect to the piston speed in the shock absorber 1 of the first embodiment.

In FIG. 4, the orifice region means a damping force characteristic in a case where the moving speed of the piston rod 6 is small, the disc valve 152 does not open, and the oil liquid flows from the cylinder upper chamber 2A to the cylinder lower chamber 2B through the hole 221 and the notch 222 or from the cylinder lower chamber 2B to the cylinder upper chamber 2A. When the moving speed of the piston rod 6 is small, the damping force is in the orifice region illustrated in FIG. 4. In this orifice region, an orifice characteristic occurs in which the damping force rapidly increases as the sliding speed (piston speed) of the piston 5 increases.

Thereafter, when the moving speed of the piston rod 6 further increases, the pressure of the oil liquid applied to the disc valve 152 increases, and the disc valve 152 opens. In this case, the flow of the oil liquid is obtained by adding the flow in the disc valve region to the flow (flow through the hole 221 and the notch 222) in the orifice region described above. That is, when the disc valve 152 opens, a gap is formed between the disc 111 and the valve seat portion 47 over the entire circumference of the valve seat portion 47 of the piston 5, and the oil liquid also flows out from this gap. Therefore, the area of the flow path in the piston 5 through which the oil liquid flows rapidly increases.

The damping force at this time has a characteristic that the variation of the damping force with respect to the sliding speed of the piston 5 is small, as illustrated in the disc valve region of FIG. 4. In the case where the seat width of the valve seat portion is formed constant like a conventional shock absorber, the damping force shows a characteristic in which the inclination of the damping force becomes sharp immediately after switching from the orifice region to the disc valve region as illustrated by the dotted line in FIG. 4.

Figure 5:
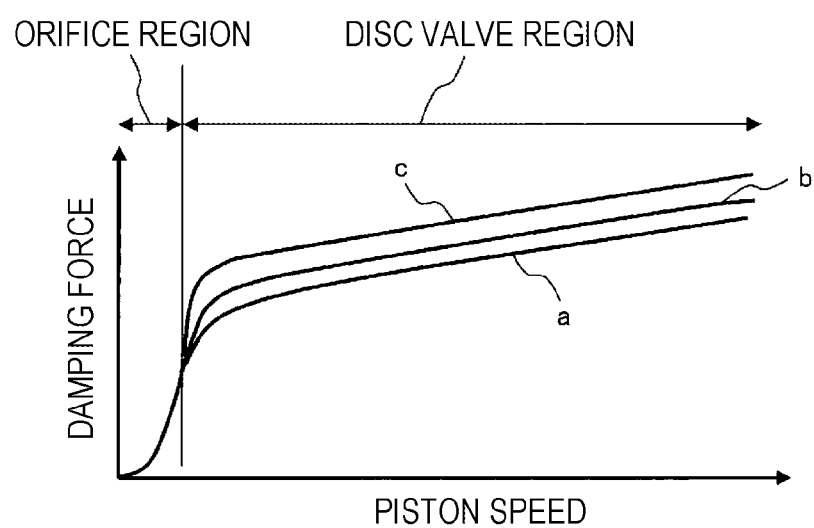
FIG. 5 is a diagram illustrating a change in damping force with respect to the piston speed when a seat width is changed in a conventional shock absorber.

The inclination of the disc valve region depends on the rigidity of the disc valve. In the conventional shock absorber, the rigidity of the disc valve is constant, so that the damping force characteristic is substantially constant. That is, the damping force characteristic when the rigidity of the disc valve is the same is as illustrated in FIG. 5. FIG. 5 is a diagram for explaining a change in damping force with respect to the piston speed when the seat width is changed in the conventional shock absorber. In FIG. 5, curve a illustrates a change in damping force with respect to the piston speed when the seat width is small, curve c illustrates a change in damping force in a case where the seat width is large, and curve b illustrates a change in damping force with respect to the piston speed in a case where the seat width is between a and c.

As illustrated by curve c, when the seat width is large, the flow resistance between the valve seat portion and the disc becomes large, so the damping force becomes large. As illustrated by curve a, when the seat width is small, the damping force becomes small. Further, as illustrated by curves a to c, the inclination of the change in damping force becomes the same as illustrated by curves a to c regardless of the size of the seat width.

On the other hand, like the shock absorber 1 of this embodiment, the inclination of the damping force immediately after switching from the orifice region to the disc valve region can be made smooth as illustrated by the solid line curve in FIG. 4 by providing the large seat portion 47a with a large seat width and the small seat portion 47b with a small seat width in the circumferential direction of the valve seat portion 47.

That is, in this embodiment, in the oil liquid flow path in the gap between the disc 111 and the valve seat portion 47, which is caused by the opening of the disc valve 152, the oil liquid flows mainly from the small seat portion 47b since the flow resistances of the oil liquid in the large seat portion 47a and the small seat portion 47b are different.

As illustrated in FIG. 5, when the seat width of the valve seat portion is small, the flow resistance is reduced, and thus the inclination of the change in damping force immediately after switching from the orifice region to the disc valve region. However, the damping force in the disc valve region thereafter is lowered. On the other hand, when the seat width of the valve seat portion is large, the inclination of the change in damping force immediately after switching from the orifice region to the disc valve region becomes large, and the damping force in the disc valve region thereafter also increases.

On the other hand, in this embodiment, the seat width of the valve seat portion 47 is changed in the circumferential direction, and the large seat portion 47a having a large seat width and the small seat portion 47b having a small seat width are provided. Therefore, the ratio of the large seat portion 47a and the small seat portion 47b in the circumferential direction can be adjusted when these seat widths are large. This makes it possible to adjust the inclination of the change in the initial damping force when the orifice region is switched to the disc valve region and the magnitude of the damping force in the disc valve region.

Therefore, according to this embodiment, it is possible to realize the shock absorber 1 in which the inclination of the change in the initial damping force when the orifice region is switched to the disc valve region is small, and a sufficient damping force is obtained even in the disc valve region, if the circumferential ratio and the seat widths of the large seat portion 47a and the small seat portion 47b are appropriately adjusted. That is, it is possible to suppress a steep change in the damping force when changing from the orifice region to the disc valve region by lowering the damping force in the initial stage of the disc valve region as illustrated by the solid line in FIG. 4. Therefore, the riding comfort can be improved.

In this embodiment, the valve seat portion 47 has a non-uniform seat width in the circumferential direction, but the inner diameter side of the valve seat portion 47 maintains a circular shape, and the outer diameter is changed so as to form the large seat portion 47a and the small seat portion 47b. Therefore, when the disc 111 is pressed against the valve seat portion 47 by the axial force for fixing the disc valve 152, the circular portion of the valve seat portion 47 does not have a gap over the entire circumference, and the disc 111 can be brought into close contact with the valve seat portion 47. Therefore, although the valve seat portion 47 has a non-circular shape, it is not necessary to consider the leakage caused thereby.

In the conventional shock absorber, the width of the valve seat portion is constant in the circumferential direction, and unlike this embodiment, the large seat portion and the small seat portion are not provided, so that the shock absorber shows the characteristics illustrated in FIG. 5 but cannot obtain the damping force characteristic as illustrated by the solid line in FIG. 4. That is, it is not possible to realize a shock absorber that can reduce the inclination of the change in the initial damping force when the orifice region is switched to the disc valve region and obtain a sufficient damping force even in the disc valve region.

Even in the conventional shock absorber, it is possible to adjust the rising characteristics of the damping force by adjusting the rigidity of the disc valve, but there is a demerit that the number of discs increases, and the adjustment of the damping force in the range where the piston speed is large. On the other hand, in this embodiment, since the adjustment can be performed by changing the shape of the piston side without changing the rigidity of the disc valve, it is possible to suppress the increase in the number of discs. The adjustment of the damping force in the range where the piston speed is large can be increased.

As described above, in the shock absorber 1 according to this embodiment, the valve seat portion 47 is configured by the large seat portion 47a and the small seat portion 47b. The outer diameter of the disc 111 that is in close contact with the valve seat portion 47 is set to a diameter equal to or more than the large seat portion 47a. Therefore, it is possible to suppress a steep change in the damping force when changing from the orifice region to the disc valve region by lowering the damping force in the initial stage of the disc valve region. The riding comfort can be improved.

In the above-described first embodiment, the valve seat portion 47 has been exemplified to have two types of seat widths of the large seat portion 47a and the small seat portion 47b, but may be configured by three or more types of seat widths. Further, even if the outer shape of the valve seat portion 47 is elliptical or the like and the seat width is continuously changed in the circumferential direction of the valve seat portion, the same effect as that of the above-described embodiment can be obtained.

Further, in the description of the first embodiment, the example in which the large seat portion 47a and the small seat portion 47b are provided in the valve seat portion 47 has been described, but the valve seat portion 49 may be provided with the large seat portion 47a and the small seat portion 47b. Alternatively, both the valve seat portions 47 and 49 may be provided with a large seat portion and a small seat portion. The inner diameter side of the valve seat portion 47 may have any shape as long as the outer diameter side protrudes from the inner diameter side even if the shape is not substantially circular such as circular or elliptical and has no irregularities. That is, the inner diameter side may have no recess.

Second Embodiment

Figure 6:
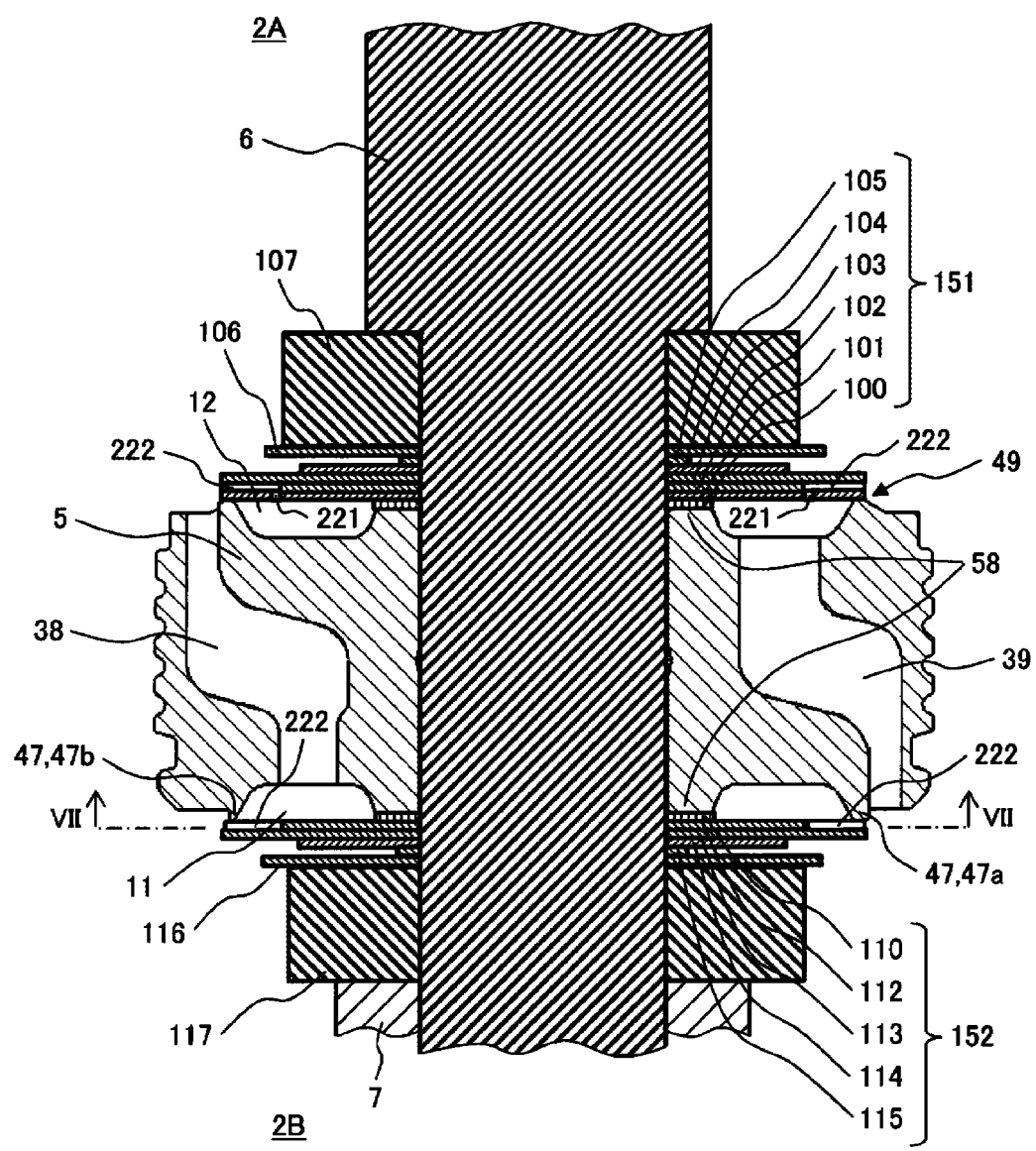
FIG. 6 is a diagram for explaining a second embodiment of the shock absorber of the invention, and is an enlarged cross-sectional view of a main part corresponding to FIG. 2.
Figure 7A:
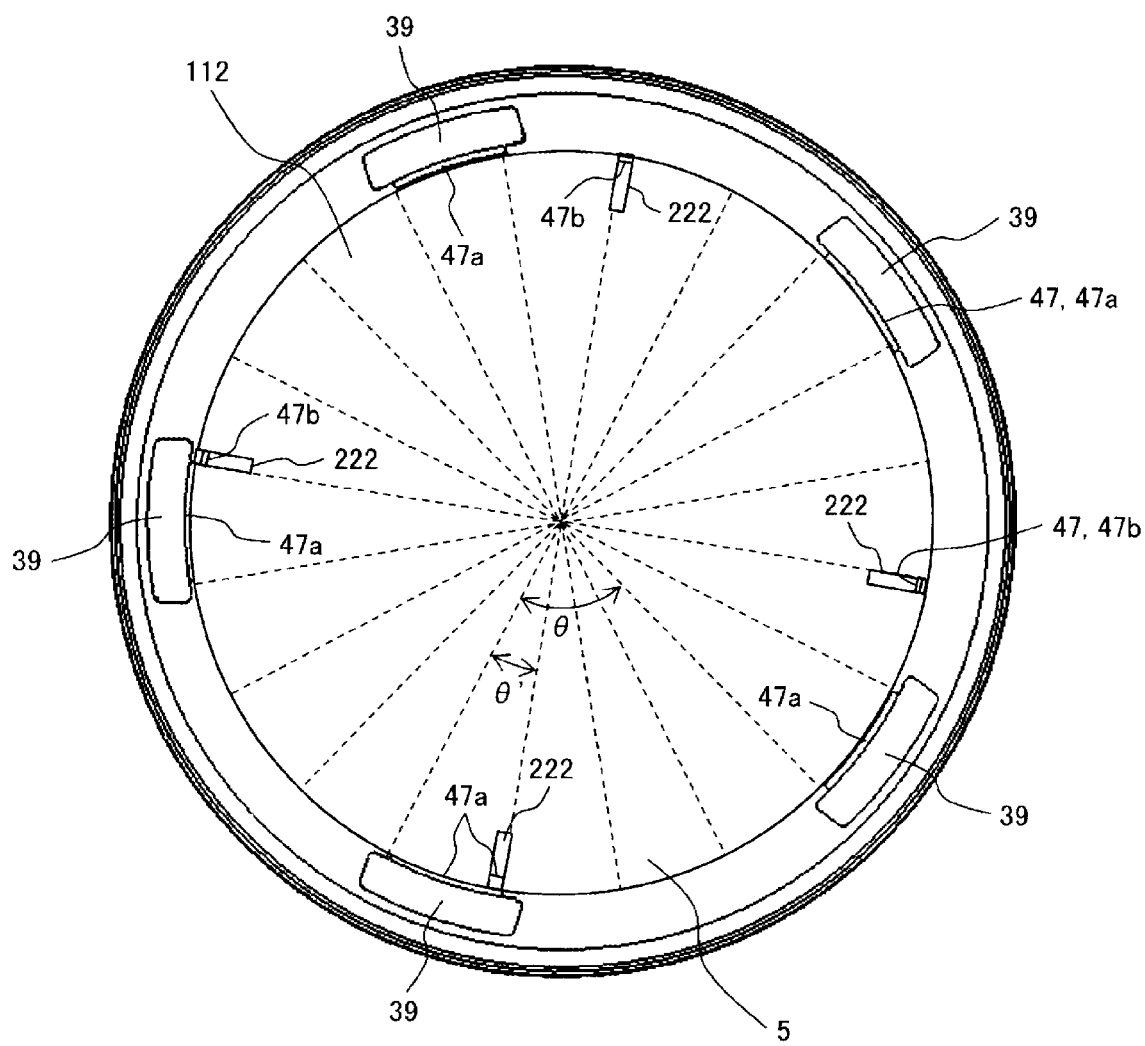
FIG. 7A is a diagram taken along the line VII-VII of FIG. 6.

A second embodiment of the shock absorber of the invention will be described using FIGS. 6 and 7A. FIG. 6 is an enlarged cross-sectional view of the main part corresponding to FIG. 2, and FIG. 7A is a view taken along the line VII-VII of FIG. 6, illustrating a bottom view of the piston and the disc. The portions attached with the same symbols as FIGS. 1 to 3 are the same or corresponding portions. The description of the same portions as those of the first embodiment will be omitted, and different parts will be mainly described.

The second embodiment differs from the first embodiment in the number of stacked disc valves 152, and as illustrated in FIG. 6, the piston 5 has the same configuration as that of the first embodiment. In this embodiment, the disc 111 having the hole 221 illustrated in FIG. 2 is not provided, but the disc 112 having the notch 222 is provided directly above the valve seat portion 47.

As a result, the flow of the oil liquid in the orifice region where the disc valve 152 is closed passes from the cylinder upper chamber 2A through the passage hole 38 and the passage 11, and flows out from the notches 222 provided in the disc 112 to the cylinder lower chamber 2B. Further, the oil liquid flows from the cylinder upper chamber 2A into the passage 12 through the notch 222 of the disc 102 forming the disc valve 151 and the hole 221 provided in the disc 101, and further flows out to the cylinder lower chamber 2B through the passage hole 39.

Therefore, compared with the first embodiment, the flow path length of the orifice in the disc valve 152 is shorter, but the flow path area of the notch 222 of the disc 112 or the notch 222 of the disc 102 is reduced to increase the flow resistance. Therefore, it is possible to suppress the decrease in damping force as in the first embodiment. The seat width of the valve seat portion 47 of the piston 5 in this embodiment is different in the circumferential direction as in the first embodiment, and has the large seat portion 47a and the small seat portion 47b.

Therefore, the seat widths are different in the notch 222 in contact with the portion having the large seat width and the notch 222 in contact with the portion having the small seat width among the notches 222 of the disc 112. Therefore, the flow resistance is changed, and the phase in the circumferential direction of the disc 112 having the notches 222 is influenced.

Therefore, when laminating the disc 112 having the notch 222 on the piston 5, it is necessary to perform fixing in consideration of the circumferential phase between the large seat portion 47a and the small seat portion 47b of the valve seat portion 47 and the notch 222 of the disc 112 in advance. The correspondence of this embodiment to this will be described using FIG. 7A with reference to FIG. 3.

In FIG. 7A, the structure of the valve seat portion is the same as that of the valve seat portion 47 illustrated in FIG. 3. In FIGS. 3 and 7A, θ is 72° in this embodiment, where θ is a portion similar to the circumferential direction of the valve seat portion 47. That is, the valve seat portions 47 have the same shape at 72° intervals in the circumferential direction. Further, when the angle at which the large seat portion 47a is provided in the valve seat portion 47 is θ', θ' is 18° in this embodiment.

The number of notches provided in the disc 112 in the valve seat portion 47 configured as described above can be obtained as follows.

First, the ratio "θ/θ'" between the portion θ similar to the circumferential direction of the valve seat portion 47 and the angle θ' at which the large seat portion 47a is provided is obtained. In this example, θ/θ'=72°/18°=4. The number n of the notches 222 provided on the disc 112 may be set to a real multiple (an integer multiple) of the number obtained by the ratio We'. That is, in FIG. 7A, the number n of the notches 222 provided in the disc 112 is 4, and the notches 222 are provided at equal intervals in the circumferential direction.

As described above, by setting the number n of the notches 222 to a real multiple of "θ/θ'", the configuration can be made in which the attitude of the disc 112 in the circumferential direction, that is, the phase in which the disc 112 is installed is not affected. Therefore, according to this embodiment, the ratio of the large seat portion in contact with the notch 222 of the disc 112 can be always constant regardless of the phase in which the disc 112 is installed, and is not affected by the installation phase of the disc 112.

In the example illustrated in FIG. 7A, the number of the notches 222 provided on the disc 112 is four, which is one times 4 which is the value of "θ/θ'". However, the number n of the notches 222 provided in the disc 112 may be the number of the notches 222 that is double, triple, . . . and so on times 4 which is the value of "θ/θ'".

Figure 7B:
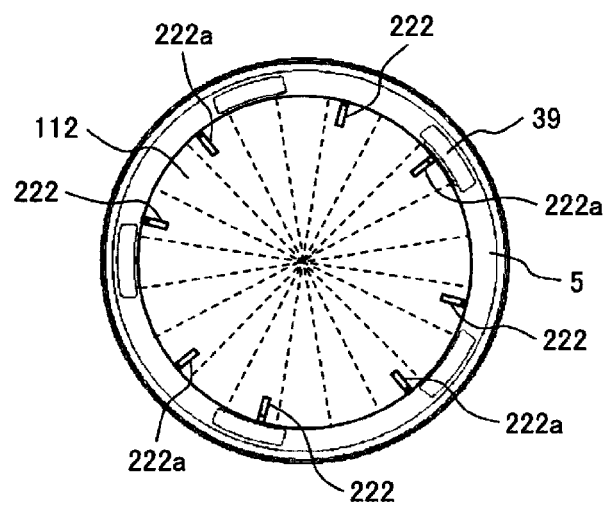
FIG. 7B is a diagram illustrating a modification of the shock absorber illustrated in FIG. 7A, and is a diagram corresponding to FIG. 7A.

FIG. 7B illustrates an example in which the number n of the notches 222 provided in the disc 112 is eight, which is twice the value of "θ/θ'" which is 4. If eight notches are provided, all the notches 222 may be arranged at equal intervals in the circumferential direction, but first, four notches 222 are arranged at equal intervals in the circumferential direction as in FIG. 7A, and the remaining four notches 222a may be arranged at equal intervals in the circumferential direction. The interval between the notches 222 and the notches 222a may be arbitrary, but in FIG. 7B, the notch 222a is disposed with respect to the notch 222 at a position in the circumferential direction separated by 36°, which is twice the angle θ' (18°) at which the large seat portion 47a is provided.

Figure 7C:
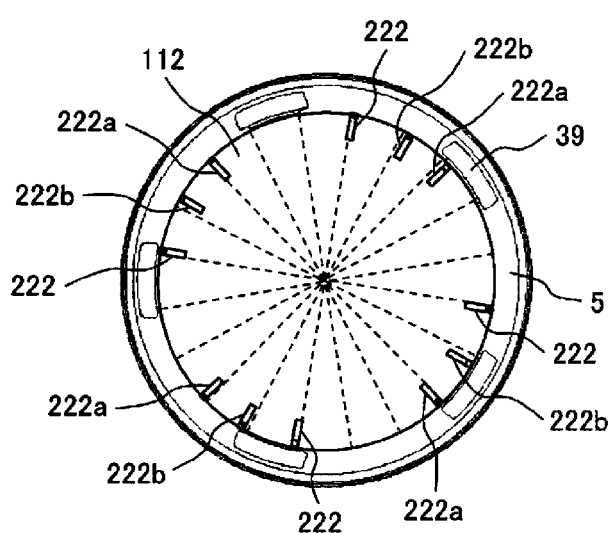
FIG. 7C is a diagram illustrating still another modification of the shock absorber illustrated in FIG. 7A, and is a diagram corresponding to FIG. 7A.

FIG. 7C illustrates an example in which the number n of the notches 222 provided on the disc 112 is 12 which is three times the value "θ/θ'" which is 4. Even when 12 notches are provided, all the notches 222 may be arranged at equal intervals in the circumferential direction, but first, the four notches 222 are arranged at equal intervals in the circumferential direction as in FIG. 7A, and four notches 222a among the remaining eight notches are arranged at equal intervals in the circumferential direction. Further, the remaining four notches 222b may be arranged at equal intervals in the circumferential direction. The intervals of the notches 222, 222a, and 222b may be arbitrary, but in FIG. 7C, the notch 222a is disposed with respect to the notch 222 at a position in the circumferential direction separated by 36°, which is twice the angle θ' (18°) at which the large seat portion 47a is provided, and disposed at a position in the circumferential direction separated by 18°, which is one times the angle θ' (18°) with respect to the notch 222b.

In the second embodiment, the example in which the notch 222 is provided in the disc 112 has been described. However, even if the notch may be provided in the large seat portion 47a or the small seat portion 47b of the valve seat portion 47 instead of providing the notch 222 in the disc 112, the same effect can be obtained.

Further, in the above description, the example in which the second embodiment is applied to the disc valve 152 has been described, but the same can be applied to the disc valve 151.

In the disc 112 illustrated in FIGS. 7A to 7C, the rod through hole through which the piston rod penetrates is omitted.

Third Embodiment

Figure 8A:
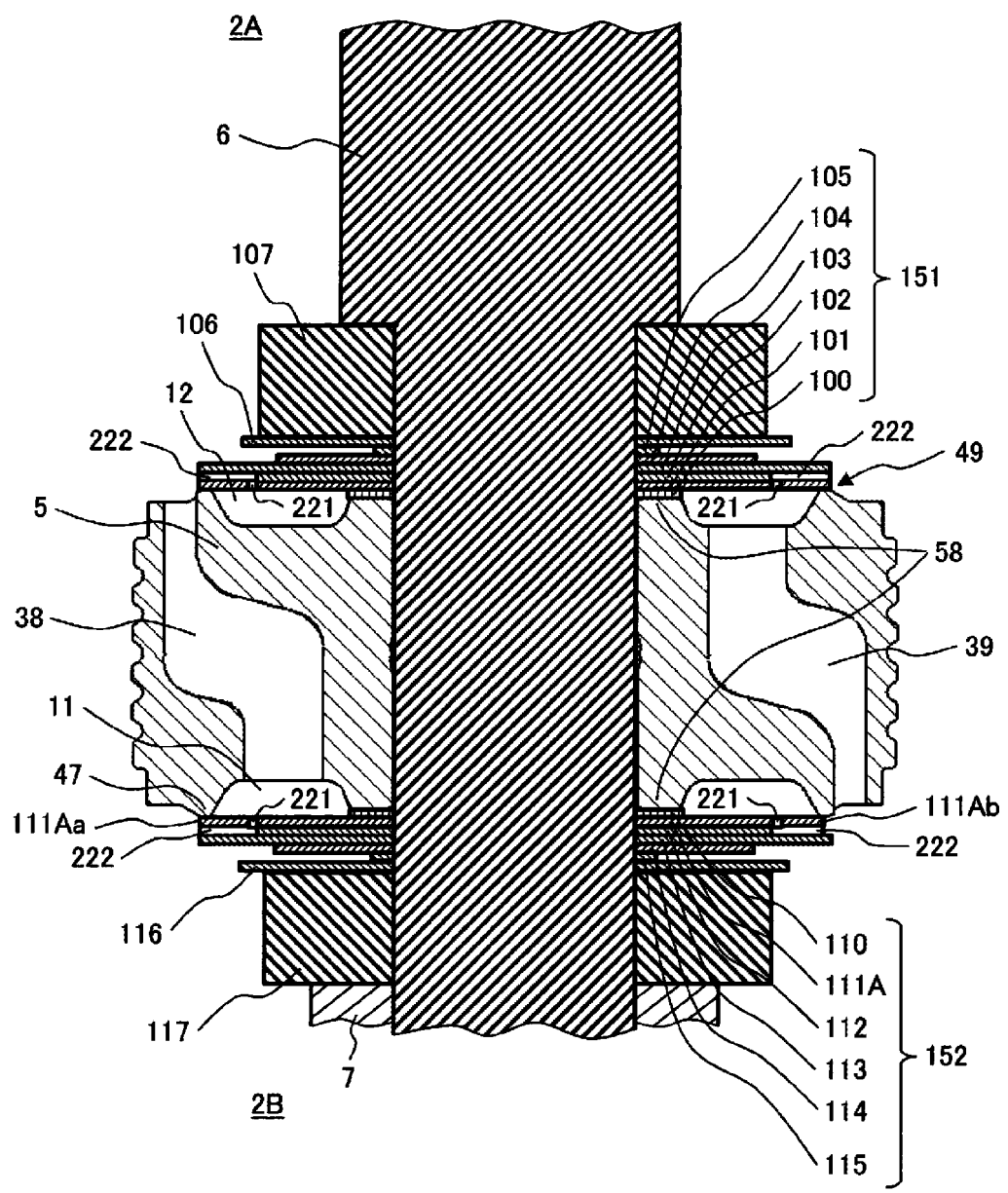
FIG. 8A is a diagram for explaining a third embodiment of the shock absorber of the invention, and is an enlarged cross-sectional view of a main part corresponding to FIG. 2.
Figure 8B:
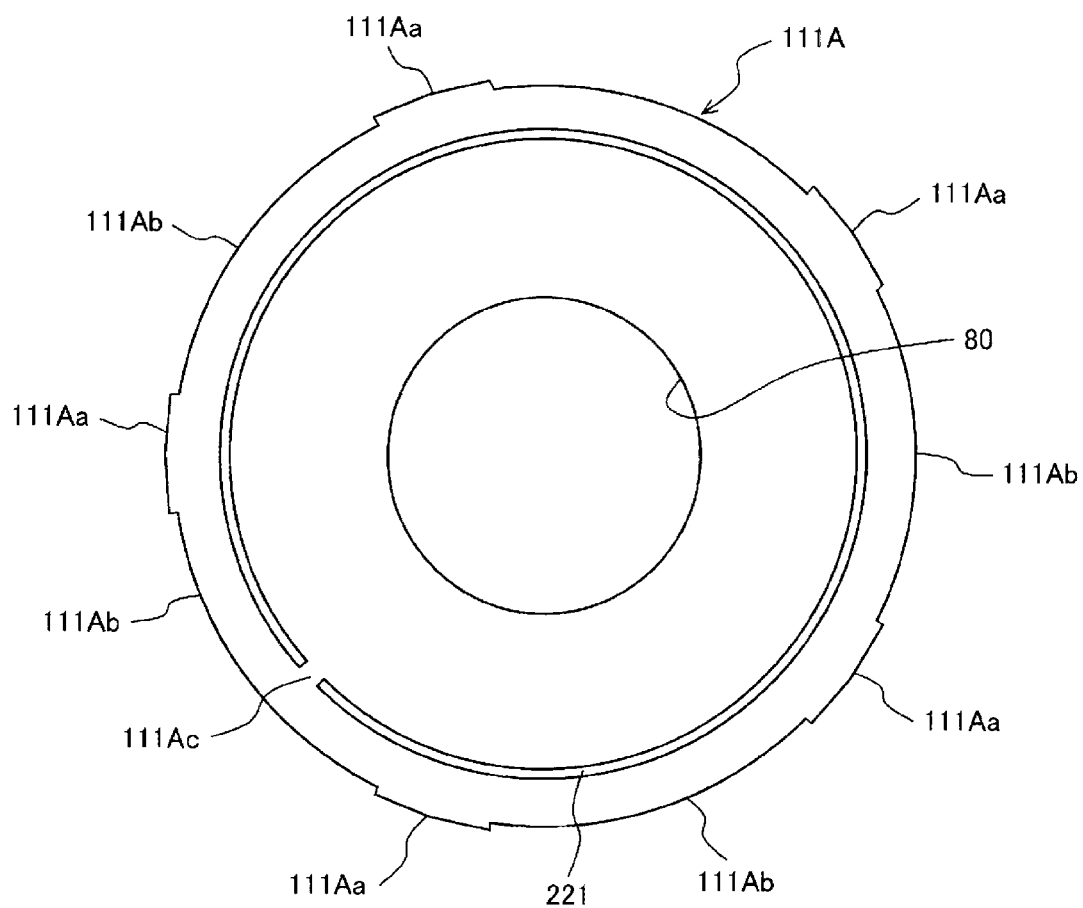
FIG. 8B is a plan view illustrating the shape of a disc 111A illustrated in FIG. 8A.

A third embodiment of the shock absorber of the invention will be described using FIGS. 8A and 8B. FIG. 8A is an enlarged cross-sectional view of the main part corresponding to FIG. 2, and FIG. 8B is a plan view illustrating the shape of the disc 111A illustrated in FIG. 8A. The portions attached with the same symbols as FIGS. 1 to 3 are the same or corresponding portions. The description of the same portions as those of the first embodiment will be omitted, and different parts will be mainly described.

The third embodiment is different from the first embodiment in the configuration of the disc valve 152 and the configuration of the piston 5. In this embodiment, the valve seat portion 47 of the piston 5 is not configured to have the large seat portion 47a and the small seat portion 47b unlike the valve seat portion 47 illustrated in FIG. 2. Similarly to the conventional valve seat portion, the valve seat portion has an annular shape with a constant seat width.

On the other hand, among the discs of the disc valve 151, the disc 111A in close contact with the valve seat portion 47 has the outer diameter shape which is changed in the circumferential direction as illustrated in FIG. 8B. That is, as illustrated in FIG. 8B, a large diameter portion 111Aa having a large diameter and a small diameter portion 111Ab having a small diameter are configured. The large diameter portion 111Aa is disposed in the circumferential direction similarly to the large seat portion 47a of the valve seat portion 47 illustrated in FIG. 3. The small diameter portion 111Ab is disposed in the circumferential direction like the small seat portion 47b of the valve seat portion 47 illustrated in FIG. 3. As described above, in this embodiment, the outer diameter shape of the disc 111A is configured to have different outer diameters in the circumferential direction like the large seat portion 47a and the small seat portion 47b illustrated in FIG. 3.

The outer diameter of the valve seat portion 47 illustrated in FIG. 8A is equal to or greater than the maximum diameter of the disc 111A in close contact with the valve seat portion 47. The inner diameter of the valve seat portion 47 is equal to or less than the minimum diameter of the disc 111A.

In FIGS. 8A and 8B, the hole 221 is provided. As illustrated in FIG. 8B, this hole 221 is configured as a long hole formed over substantially the entire circumference in the circumferential direction. A connecting portion 111Ac is provided which connects a portion of the disc 111A on the outer peripheral side of the hole 221 and a portion of the disc 111A on the inner peripheral side of the hole 221. Further, a rod through hole 80 is provided through which the piston rod 6 penetrates.

According to the third embodiment, since the outer diameter shape of the disc 111A is configured to have different outer diameter shapes in the circumferential direction, the same effect as that of the first embodiment can be obtained using the piston 5 having the valve seat portion with a constant seal width, which has been conventionally used. That is, also in this embodiment, it is possible to suppress a steep change in the damping force when changing from the orifice region to the disc valve region by lowering the damping force in the initial stage of the disc valve region. The riding comfort can be improved.

In the third embodiment illustrated in FIG. 8A, only the disc 111A of the disc valve 152 has an outer diameter shape different in the circumferential direction, but the same effect as the disc 111A can be obtained by forming also the disc 101 of the disc valve 151 with the same configuration.

Fourth Embodiment

Figure 9:
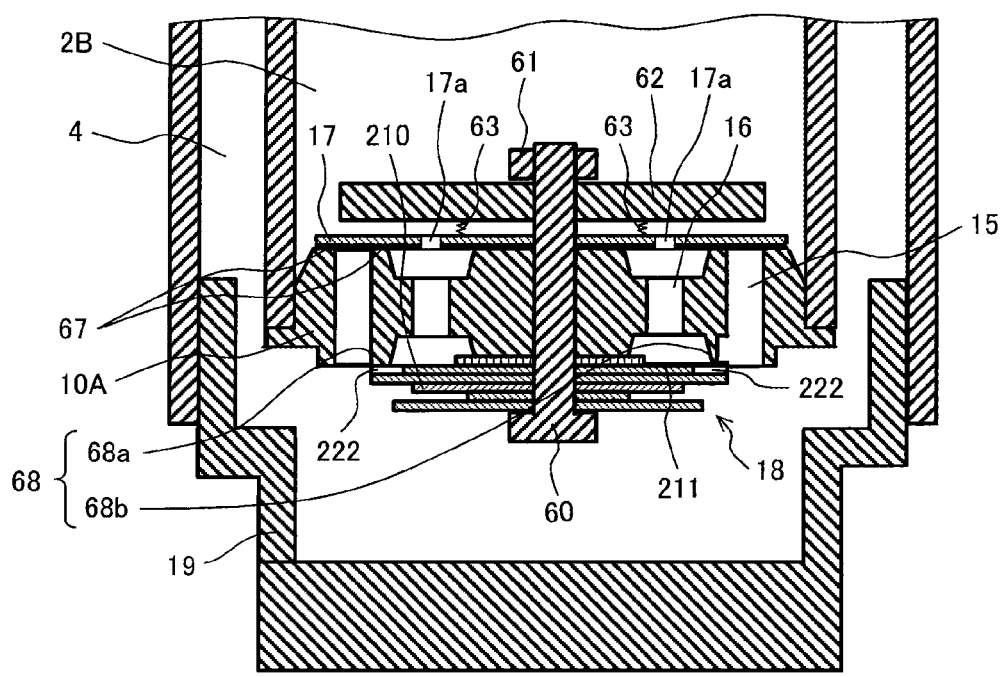
FIG. 9 is a diagram for explaining a fourth embodiment of the shock absorber of the invention, and is an enlarged cross-sectional view of a main part around a base valve illustrated in FIG. 1.

Hereinafter, the shock absorber according to a fourth embodiment of the invention will be described using FIG. 9. FIG. 9 is a diagram for explaining the fourth embodiment and is an enlarged cross-sectional view of the main part around the base valve illustrated in FIG. 1. The portions attached with the same symbols as FIGS. 1 to 3 are the same or corresponding portions. The description of the same portions as those of the first embodiment will be omitted, and different parts will be mainly described.

In the fourth embodiment, the invention is applied to a base valve fitted and fixed to the inner peripheral portion of the lower end of the cylinder 2. A base valve (valve body) 10A according to the fourth embodiment has basically the same configuration as the base valve 10 according to the first embodiment. As illustrated in FIG. 9, the disc valve 18 includes a plurality of discs 210 and one disc 211 that is in close contact with a lower surface seat portion 68 and has the notch 222 on the outer circumference. Further, a check valve 17 configured by one disc is provided, and is fixed by a mounting pin 60 and a nut 61.

In the base valve 10A, the check valve (disc) 17 functions as a suction valve, and is pressed against an upper surface seat portion 67 of the base valve 10A by a spring member 63 between a regulation disc 62 and the check valve 17 so as to be in close contact.

This check valve 17 opens only when the piston rod 6 moves to the extension side, and the oil liquid moves from the reservoir 4 to the cylinder lower chamber 2B through a passage 15 provided on the outer diameter side of the base valve 10A. When the piston rod 6 moves to the pressure side, the check valve 17 closes the passage 15.

On the other hand, the check valve 17 is provided with a hole 17a closer to the center than the passage 15, and the oil liquid flows from the hole 17a to the passage 16 provided on the inner diameter side of the base valve 10A. After that, the oil liquid flows from the notch 222 provided on the outer periphery of the disc 211 to the reservoir 4. When the moving speed of the piston rod 6 increases, the disc 211 and the plurality of discs 210 open.

In this embodiment, like the valve seat portion 47 of the piston 5 illustrated in the first embodiment, the lower surface seat portion 68 of the base valve 10A is configured by a large seat portion 68a and a small seat portion 68b. With such a configuration, the same effect as the piston 5 illustrated in the first embodiment can be realized with the base valve 10A, and a sudden change in damping force when changing from the orifice region to the disc valve region can be suppressed. It is possible to improve the riding comfort with a simple configuration.

In this embodiment, the oil liquid flows from between the disc 211 and the lower surface seat portion 68 in the orifice region, but it is possible to eliminate the influence of the phase difference in the circumferential direction caused by the large seat portion 68a and the small seat portion 68b, that is, the phase difference as described in the second embodiment by sandwiching one disc having the hole 221 like the disc 111 of the disc valve 152 in the first embodiment.

Further, the invention is not limited to the above embodiments, but various modifications may be contained. In addition, some of the configurations of a certain embodiment may be replaced with the configurations of the other embodiments, and the configurations of the other embodiments may be added to the configurations of the subject embodiment.

Further, the above embodiments have been described in detail for easy understanding of the invention, and the invention is not necessarily limited to having all the configurations described.

Further, in the above-described embodiment, the description has been given mainly on the case of the extension stroke of the piston rod 6. However, the same effect can be obtained by dividing the shape of the valve seat portion into the large seat portion and the small seat portion also for the disc valve side which operates during the compression stroke.

Fifth Embodiment

Figure 10:
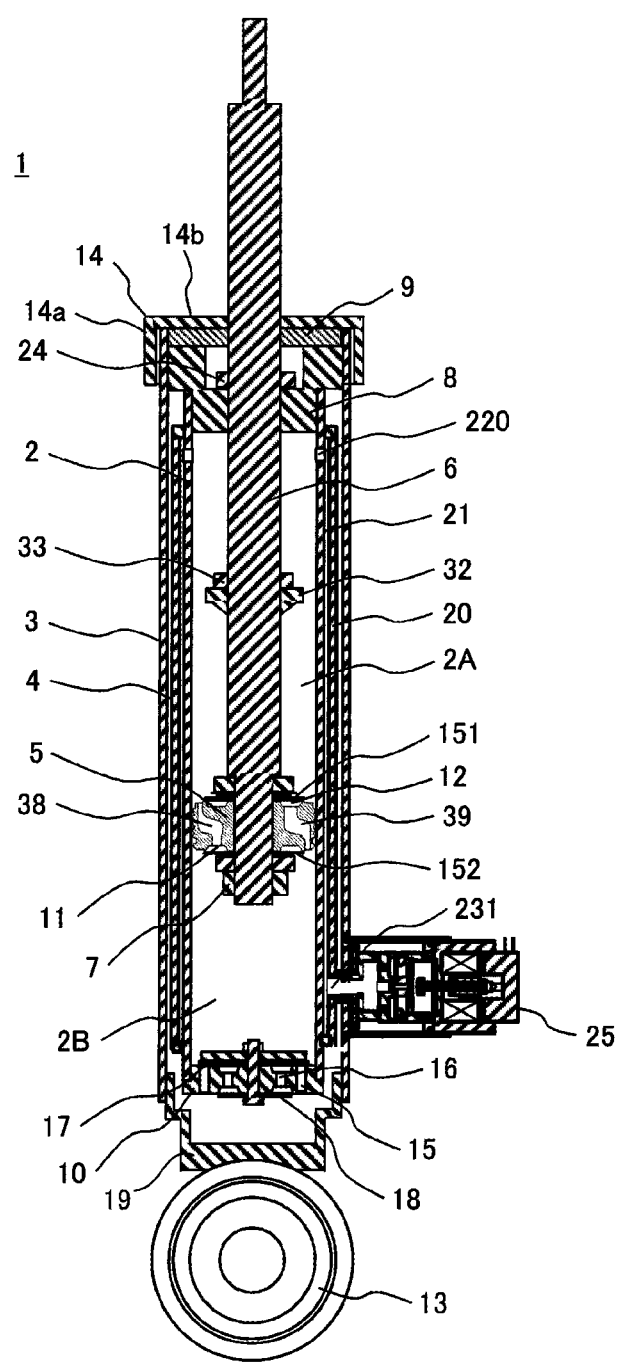
FIG. 10 is a vertical cross-sectional view illustrating a fifth embodiment of the shock absorber of the invention.
Figure 11:
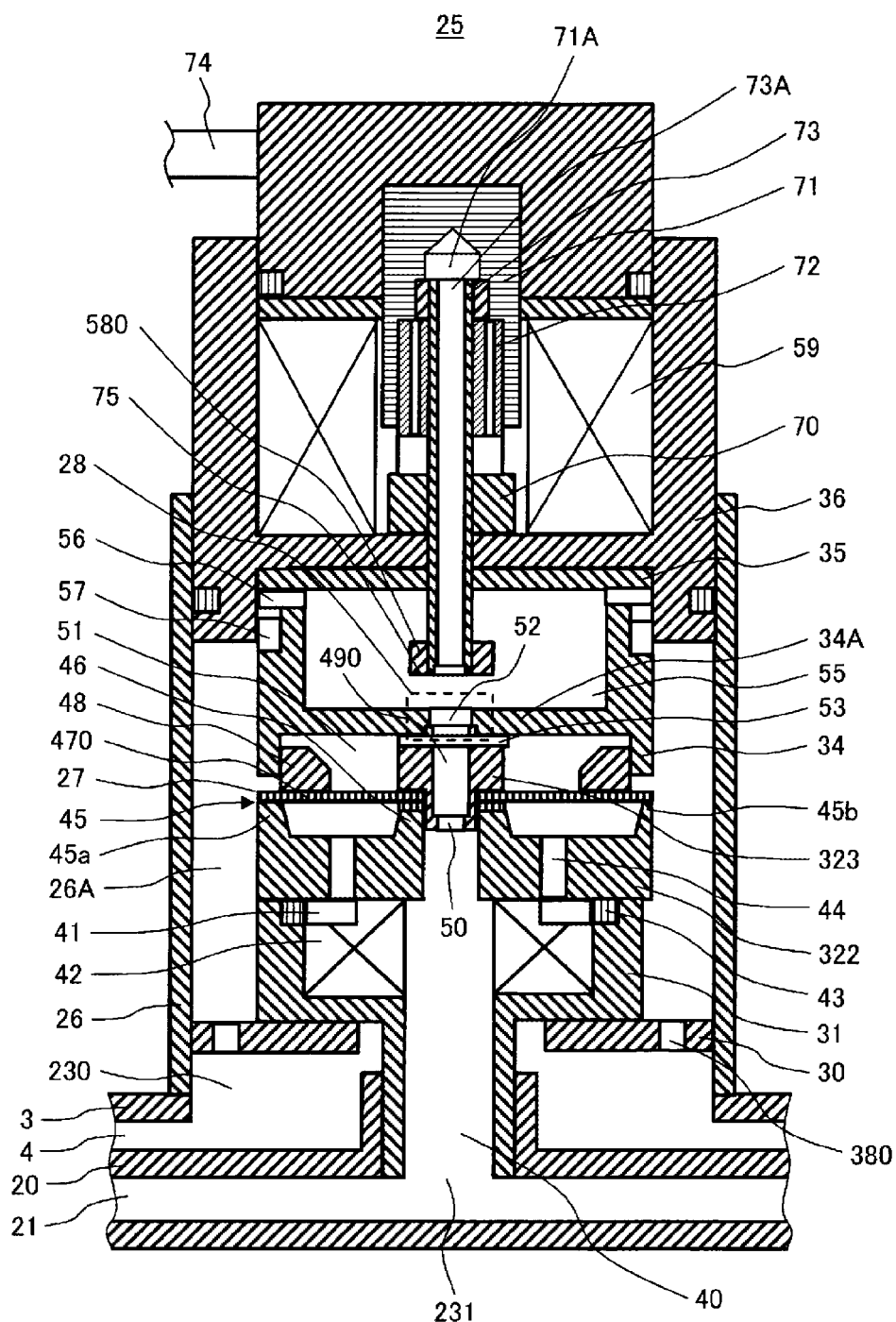
FIG. 11 is an enlarged cross-sectional view of a main part of a damping force generating mechanism illustrated in FIG. 10.

A fifth embodiment of the shock absorber of the invention will be described using FIGS. 10 and 11. FIG. 10 is a vertical cross-sectional view illustrating the shock absorber according to the fifth embodiment, and FIG. 11 is an enlarged cross-sectional view of the main part illustrating a damping force generating mechanism 25 illustrated in FIG. 10. The portions attached with the same symbols as FIGS. 1 to 3 are the same or corresponding portions. The description of the same portions as those of the first embodiment will be omitted, and different parts will be mainly described.

The fifth embodiment illustrates an example in which the invention is applied to the damping force generating mechanism 25 provided so as to project on the lower side surface of the shock absorber 1.

In this embodiment, as illustrated in FIG. 10, as a means (a damping force generating mechanism) for generating a damping force in the shock absorber, a damping force generating mechanism provided in the piston portion as in the first to third embodiments and a damping force generating mechanism provided in the base valve portion as in the fourth embodiment are provided. Further, the damping force generating mechanism 25 provided so as to project in the lower side surface of the shock absorber 1 is provided. In this embodiment, the damping force generating mechanisms provided in the piston and the base valve may be the same as the conventional one.

As illustrated in FIG. 10, the shock absorber 1 of this embodiment has a double cylinder structure in which the outer cylinder 3 is provided outside the cylinder 2, and the reservoir 4 is formed between the cylinder 2 and the outer cylinder 3. The piston 5 is slidably inserted in the cylinder 2, and the piston 5 defines the interior of the cylinder 2 into two chambers, the cylinder upper chamber 2A and the cylinder lower chamber 2B. One end of a piston rod 6 is connected to the piston 5 by a nut 7, and the other end side of the piston rod 6 passes through the cylinder upper chamber 2A, passes through the rod guide 8 and the seal member 9 which are attached to the upper ends of the cylinder 2 and the outer cylinder 3, and extended to the outside of the cylinder 2. At the lower end of the cylinder 2, the base valve 10 that partitions the cylinder lower chamber 2B and the reservoir 4 is provided.

A separator tube 20 is externally fitted to the cylinder 2 via seal members at both upper and lower ends, and an annular passage 21 is formed between the cylinder 2 and the separator tube 20. The annular passage 21 communicates with the cylinder upper chamber 2A by a passage 220 provided on a side wall near the upper end of the cylinder 2. A small-diameter opening 231 is provided on the side wall of the separator tube 20, and a large-diameter opening 230 (see FIG. 11) is provided substantially concentric with the opening 231 on the side wall of the outer cylinder 3. The damping force generating mechanism 25 is attached to the opening 230 of the outer cylinder 3.

The configuration of the portion of the piston 5 and the configuration of the portion of the base valve 10 are the same as those in the above-described embodiment, and thus the description thereof will be omitted.

Next, the damping force generating mechanism 25 will be described with reference to FIG. 11.

In a cylindrical case 26 attached to the opening 230 of the outer cylinder 3, the damping force generating mechanism 25 is provided with a pilot-type main valve 27 and a pilot valve 28 which is a solenoid-driven pressure control valve to control the valve opening pressure of the main valve 27. Inside the case 26, an annular passage plate 30, a convex passage member 31, an annular main valve member (valve body) 322, a convex orifice passage member 323, a cylindrical pilot valve member 34 having a bottom portion 34A in the middle, an annular holding member 35, and a cylindrical solenoid case 36 are inserted in order from the opening 230 side. These members are fixed by abutting each other.

A plurality of passages 380 that communicate the reservoir 4 and a chamber 26A in the case 26 are penetrated through the passage plate 30 along the axial direction. The passage member 31 has a small-diameter tip end that penetrates the passage plate 30, and a large-diameter shoulder portion that is in contact with and fixed to the passage plate 30. The tip end of the passage member 31 is liquid-tightly fitted to the opening 231 of the separator tube 20 via a seal member (not illustrated), and a passage 40 that axially penetrates the passage member 31 communicates with the annular passage 21. An annular groove 41 is formed at the end of the large diameter portion of the passage member 31, and the annular groove 41 communicates with the passage 40 via a notch 42 in the radial direction.

The main valve member (valve body) 322 has one end that is in contact with and fixed to the large diameter portion of the passage member 31, and the contact portion between the main valve member 322 and the passage member 31 is sealed by a seal member 43 provided in the annular groove 41. The main valve member 322 is provided with a plurality of passages 44 penetrating in the axial direction along the circumferential direction, and the passages 44 communicate with the annular groove 41 of the passage member 31.

At the other end of the main valve member 322, a valve seat portion (seat) 45 projects on the outer peripheral side of the openings of the plurality of passages 44, and an annular clamp portion 46 projects on the inner peripheral side. On the valve seat portion 45 of the main valve member 322, the outer peripheral portion of a disc valve 470 that forms the main valve 27 is seated. In this embodiment, the valve seat portion 45 is provided with a large seat portion 45a and a small seat portion 45b, similarly to the valve seat portion 47 of the piston 5 in the first embodiment described above.

The inner peripheral portion of the disc valve 470 is clamped by the clamp portion 46 and the shoulder portion of the large diameter portion of the orifice passage member 323. An annular sliding seal member 48 is fixed to the outer peripheral portion of the disc valve 470 on the back side. A small diameter portion of the convex orifice passage member 323 is inserted into the central opening portion of the main valve member 322, and the shoulder portion of the large diameter portion is in contact with and fixed to the disc valve 470. A passage 490 penetrates the orifice passage member 323 along the axial direction, and the passage 490 communicates with the passage 40 of the passage member 31 via a fixed orifice 50 formed at the tip end of the small diameter portion.

The pilot valve member 34 has a substantially cylindrical shape having the bottom portion 34A in the middle portion, and one end of the bottom portion 34A is in contact with and fixed to the orifice passage member 323. The sliding seal member 48 of the disc valve 470 is slidably and liquid-tightly fitted to the inner peripheral surface of the cylindrical portion on one end side of the pilot valve member 34 to form a pilot chamber 51 in the back portion of the disc valve 470. The disc valve 470 opens when receiving the pressure on the passage 44 side of the main valve member 322, and connects the passage 44 to the chamber 26A in the case 26 on the downstream side.

The internal pressure of the pilot chamber 51 acts on the disc valve 470 in the valve closing direction. A port 52 penetrates through the central portion of the bottom portion 34A of the pilot valve member 34, and the port 52 communicates with the passage 490 of the orifice passage member 323. The pilot chamber 51 communicates with a passage 490 via a notch portion 53 formed in a contact portion of the orifice passage member 323 with the bottom portion 34A of the pilot valve member 34. The notch portion 53, the passage 490, and the fixed orifice 50 form an introduction passage for introducing the oil liquid into the pilot chamber 51.

The holding member 35 abuts and is fixed to the end of the cylindrical portion of the pilot valve member 34, and forms a valve chamber 55 inside the cylindrical portion of the pilot valve member 34. The outer peripheral portions of the pilot valve member 34 and the holding member 35 are fitted in a cylindrical portion of the solenoid case 36 which is fitted and provided in the case 26, and positioned in the radial direction.

The valve chamber 55 communicates with the chamber 26A in the case 26 through a notch 56 formed in the holding member 35 and a notch 57 formed in the outer peripheral portion of the cylindrical portion of the pilot valve member 34. The port 52, the valve chamber 55, and the notches 56 and 57 form a pilot passage for connecting the pilot chamber 51 to the chamber 26A on the downstream side of the disc valve 470 (main valve 27). Inside the valve chamber 55, a valve body 580 of the pilot valve 28, which is a pressure control valve for opening and closing the port 52, is provided.

In the solenoid case 36, a coil 59, cores 70 and 71 inserted in the coil 59, a plunger 72 guided by these cores 70 and 71, and a hollow operating rod 73 connected to the plunger 72 are incorporated. These form a solenoid actuator, and the tip end of the operating rod 73 penetrates the holding member 35 and is connected to the valve body 580 in the valve chamber 55. By energizing the coil 59 through a lead wire 74, an axial thrust force is generated in the plunger 72 according to the energizing current.

The valve body 580 is formed with an annular seat portion 75 at the tip end thereof that faces the port 52 of the pilot valve member 34, and opens and closes the port 52 when the seat portion 75 seats or unseats on the connecting portion between the port 52 and the valve chamber 55. This valve body 580 is urged by the spring force of a valve spring (not illustrated) configured by a compression coil spring or the like which is an urging means interposed between the valve body 580 and the bottom portion 34A of the pilot valve member 34, and is normally in the valve open state at a retracted position illustrated in FIG. 11.

When a thrust force is generated in the plunger 72 due to the energization of the coil 59, it moves forward against the spring force of the valve spring, the seat portion 75 is seated, and the port 52 is closed. The valve opening pressure can be adjusted by controlling the energizing current to the coil 59 to adjust the thrust force of the plunger 72. This controls the internal pressure of the port 52, that is, the pilot chamber 51.

The hollow operating rod 73 penetrates the valve body 580, and when the valve is closed, that is, when the seat portion 75 is seated, a passage 73A in the operating rod 73 opens into the port 52 and communicates. As a result, a chamber 71A at the back of the operating rod 73 in the core 71 and the port 52 communicate with each other through the passage 73A, so that the pressure receiving area of the pressure in the port 52 acting on the valve body 580 can be reduced. Therefore, the variable width of the valve opening pressure of the valve element 580 with respect to the thrust force of the plunger 72 can be widened.

Next, the effects of this embodiment will be described. The lead wire 74 is connected to an in-vehicle controller or the like, the coil 59 is energized to seat the seat portion 75 of the valve body 580, and the pilot valve 28 executes pressure control.

During the extension stroke of the piston rod 6, the oil liquid on the cylinder upper chamber 2A side is pressurized and passes through the passage 220 and the annular passage 21 illustrated in FIG. 10, and flows from the opening 231 of the separator tube 20 into the passage 40 of the passage member 31 of the damping force generating mechanism 25 illustrated in FIG. 11. At this time, the oil liquid corresponding to the movement of the piston 5 flows from the reservoir 4 into the cylinder lower chamber 2B.

In the damping force generating mechanism 25, the oil liquid flowing in from the passage 40 of the passage member 31 passes through the fixed orifice 50 of the orifice passage member 323, the passage 490, and the port 52 of the pilot valve member 34 before the disc valve 470 of the main valve 27 having a small piston speed is opened, and pushes and opens the valve body 580 of the pilot valve 28 to flow into the valve chamber 55. Further, the oil liquid flows into the reservoir 4 through the notch 56 of the holding member 35, the notch 57 of the pilot valve member 34, the chamber 26A in the case 26, and the passage 380 of the passage plate 30.

When the piston speed increases and the pressure on the cylinder upper chamber 2A side reaches the valve opening pressure of the disc valve 470, the oil liquid flowing into the passage 40 passes through the notch 42, the annular groove 41, and the passage 44, pushes and opens the disc valve 470, passes through the gap formed with respect to the valve seat portion 45, and directly flows into the chamber 26A in the case 26.

At this time, in this embodiment, since the valve seat portion 45 is configured by the large seat portion 45a and the small seat portion 45b and the seat width is changed in the circumferential direction, the flow resistance of the oil liquid can be changed in the circumferential direction. Thereby, from the characteristic of the dotted line illustrated in FIG. 4, as illustrated by the solid line, it is possible to change the characteristic of the disc valve region, so that a sudden change in damping force when changing from the orifice region to the disc valve region can be suppressed as in the first to fourth embodiments. It is possible to improve the riding comfort with a simple configuration.

During the compression stroke of the piston rod 6, the movement of the piston 5 in the cylinder 2 causes the oil liquid in the cylinder lower chamber 2B to flow into the cylinder upper chamber 2A, and causes the oil liquid corresponding to the inserted portion of the piston rod 6 into the cylinder 2 to flow from the cylinder upper chamber 2A to the reservoir 4 through the same passage as in the above extension stroke.

As a result, in any of the expansion and compression strokes of the piston rod 6, if the sliding speed of the piston rod 6 is low, the damping force generating mechanism 25 generates a damping force by the fixed orifice 50 and the valve opening pressure of the valve body 580 of the pilot valve 28, the sliding speed of the piston rod 6 is increased, and when the disc valve 470 is opened, the damping force is generated according to the opening degree.

Furthermore, in this embodiment, the valve opening pressure of the pilot valve 28 can be adjusted by controlling the energizing current supplied to the coil 59, so it is possible to directly control the damping force regardless of the piston speed. At this time, the internal pressure of the pilot chamber 51 communicating with the upstream passage 490 changes due to the valve opening pressure of the pilot valve 28, and the internal pressure acts in the valve closing direction of the disc valve 470. Therefore, the valve opening pressure of the disc valve 470 can also be adjusted at the same time by controlling the valve opening pressure of the pilot valve 28, whereby the adjustment range of the damping force characteristic can be widened.

REFERENCE SIGNS LIST 1 shock absorber
2 cylinder
2A cylinder upper chamber
2B cylinder lower chamber
3 outer cylinder
4 reservoir
5 piston (valve body)
6 piston rod
7 nut
8 rod guide
9 seal member
10, 10A base valve (valve body)
11, 12, 15, 16 passage
13 mounting eye
14 cover member
14a cylindrical portion
14b inner flange portion
17 check valve
17a hole
18 disc valve
19 bottom member
20 separator tube
21 annular passage
24 friction member
25 damping force generating mechanism
26 case
26A chamber
27 main valve
28 pilot valve
30 passage plate
31 passage member
32 stopper member
33 shock absorbing body
34 pilot valve member
34A bottom
35 holding member
36 solenoid case
38, 39 passage hole
40 passage
41 annular groove
42 notch
43 seal member
44 passage
45, 47, 49 valve seat portion (seat)
45a, 47a large seat portion
45b, 47b small seat portion
46 clamp portion
48 sliding seal member
50 fixed orifice
51 pilot chamber
52 port
53 notch portion
55 valve chamber
56, 57 notch
58 fixing portion
59 coil
60 mounting pin
61 nut
62 regulation disc
63 spring member
67 upper surface seat portion
68 lower surface seat portion
68a large seat portion
68b small seat portion
70, 71 core
71A chamber
72 plunger
73 operating rod
73A passage
74 lead wire
75 seat portion
80 rod through hole
100 to 106, 110 to 116, 210, 211 disc
107, 117 annular member
111A disc
111Aa large diameter portion
111Ab small diameter portion
111Ac connecting portion
151, 152 disc valve
220 passage
221 hole
222 notch 230, 231 opening
322 main valve member (valve body)
323 orifice passage member
380 passage
470 disc valve
490 passage
580 valve body

The invention claimed is:

1. A shock absorber, comprising:
a cylinder in which a working oil liquid is sealed;
a piston that is slidably fitted in the cylinder;
a piston rod that is connected to the piston and extended to the outside of the cylinder;
a plurality of passages through which the working oil liquid flows when the piston slides in the cylinder; and
a damping force generating mechanism that is provided in a part of the passages and suppresses a flow of the working oil liquid to generate a damping force,
wherein the damping force generating mechanism includes a valve body through which the passages penetrate, an annular seat that projects from the valve body and surrounds the passages, and a disc that is seated on the seat, and
wherein a contact width at which the disc and the seat come into contact with each other varies depending on a position in a circumferential direction of the piston,
wherein in a cross-section perpendicular to an axial direction of the piston, the plurality of passages include first passage holes arranged at a first pitch in the circumferential direction of the piston, and second passage holes arranged at a second pitch in the circumferential direction of the piston, the second pitch being greater than the first pitch, the first passage holes having a circular cross-section and the second passage holes having a rectangular cross-section, the second passage holes being radially outside the first passage holes,
wherein the annular seat includes a first seat portion having a first seat width, and a second seat portion having a second seat width, the first seat width greater than the second seat width, the first and second seat portions contacting the disc, and the second passage holes being adjacent the first seat portion.

2. The shock absorber according to claim 1,
wherein the contact width at which the disc and the seat come into contact with each other varies depending on a position in a circumferential direction by changing a width of the seat in the circumferential direction.

3. The shock absorber according to claim 1,
wherein the contact width at which the disc and the seat come into contact with each other varies depending on a position in a circumferential direction by changing an outer diameter of the disc in the circumferential direction.

4. The shock absorber according to claim 1,
wherein the valve body is a piston that slides in the cylinder, and a contact width of an annular seat provided on the piston that is in contact with the disc varies depending on a position in the circumferential direction.

5. The shock absorber according to claim 1, further comprising:
an outer cylinder that is provided concentrically on an outer side of the cylinder; and
a reservoir between the cylinder and the outer cylinder,
wherein an inside of the cylinder is defined to a cylinder upper chamber and a cylinder lower chamber by the piston, and
wherein the valve body is a base valve that is fitted and fixed to an inner peripheral portion at a lower end of the cylinder and separates the cylinder lower chamber and the reservoir, and has a contact width which is in contact with the disc in an annular seat provided in the base valve and varies depending on a position in the circumferential direction.

6. The shock absorber according to claim 5,
wherein the plurality of passages is provided in the base valve to connect the cylinder lower chamber and the reservoir, a check valve is provided in one passage among the plurality of passages to allow only the oil liquid to flow from the reservoir side to the cylinder lower chamber side, and a disc valve is provided in another passage among the plurality of passages to open when a pressure of the oil liquid on the cylinder lower chamber side reaches a predetermined pressure and to release the pressure toward the reservoir side, and
wherein the disc valve includes a disc that is in contact with a seat of the base valve and has a notch in an outer periphery, and a contact width of the seat with the disc varies depending on a position in the circumferential direction.

7. The shock absorber according to claim 1, further comprising:
an outer cylinder that is provided concentrically on an outer side of the cylinder; and
a reservoir that is formed between the cylinder and the outer cylinder,
wherein an inside of the cylinder is defined to a cylinder upper chamber and a cylinder lower chamber by the piston,
wherein the damping force generating mechanism includes a main valve that is provided in a side surface portion of the outer cylinder and has a main valve member formed with an annular seat where the disc seats, and a pilot valve that controls a valve opening pressure of the main valve, and
wherein the valve body is the main valve member, and has a contact width which is in contact with the disc in an annular seat provided in the main valve member and varies depending on a position in the circumferential direction.

8. A shock absorber, comprising:
a cylinder in which a working oil liquid is sealed;
a piston that is slidably fitted in the cylinder;
a piston rod that is connected to the piston and extended to the outside of the cylinder;
a plurality of passages through which the working oil liquid flows when the piston slides in the cylinder; and
a damping force generating mechanism that is provided in a part of the passages and suppresses a flow of the working oil liquid to generate a damping force,
wherein the damping force generating mechanism includes the piston in which the passages penetrate, a plurality of annular valve seat portions that are provided projecting on both sides in an axial direction of the piston and surround each of one side of the plurality of passages, and a disc valve that seats on each of the plurality of valve seat portions, fixed on both sides of the piston in the axial direction, and includes a plurality of discs, and wherein at least one of the plurality of valve seat portions is configured such that a contact width at which the disc and the valve seat portion come into contact with each other varies depending on a portion in a circumferential direction of the piston, wherein in a cross-section perpendicular to an axial direction of the piston, the plurality of passages include first passage holes arranged at a first pitch in the circumferential direction of the piston, and second passage holes arranged at a second pitch in the circumferential direction of the piston, the second pitch being greater than the first pitch, the first passage holes having a circular cross-section and the second passage holes having a rectangular cross-section, the second passage holes being radially outside the first passage holes, wherein the valve seat portion includes a first seat portion having a first seat width, and a second seat portion having a second seat width, the first seat width greater than the second seat width, the first and second seat portions contacting the disc, and the second passage holes being adjacent the first seat portion.

9. The shock absorber according to claim 8, wherein a fixing portion of the piston for fixing the disc is formed at a height equal to or lower than the valve seat portion with respect to an axial direction of the piston.

10. The shock absorber according to claim 8, wherein the valve seat portion has an inner diameter side in a circular shape, and an outer diameter side in a shape having different diameters in the circumferential direction, so that a contact width at which the disc and the valve seat portion are in contact with each other varies depending on a position in the circumferential direction.

11. The shock absorber according to claim 10, wherein the valve seat portion includes a large seat portion having a large seat width and a small seat portion having a small seat width.

12. The shock absorber according to claim 10, wherein, among the discs of the disc valve, a disc that comes into contact with the valve seat portion has a notch directly above the valve seat portion.

\* \* \* \* \*